(12) United States Patent
Ishida et al.

(10) Patent No.: US 7,666,538 B2
(45) Date of Patent: Feb. 23, 2010

(54) FUEL CELL DEVICE

(75) Inventors: Nobuhisa Ishida, Kyoto (JP); Yasuhiro Sando, Amagasaki (JP); Kusunoki Higashino, Osaka (JP)

(73) Assignee: Konica Minolta Holdings, Inc., Tokyo (JP)

( * ) Notice: Subject to any disclaimer, the term of this patent is extended or adjusted under 35 U.S.C. 154(b) by 864 days.

(21) Appl. No.: 11/005,747

(22) Filed: Dec. 7, 2004

(65) Prior Publication Data

US 2005/0282054 A1 Dec. 22, 2005

(30) Foreign Application Priority Data

Jun. 16, 2004 (JP) .............................. 2004-178549

(51) Int. Cl.
*H01M 2/00* (2006.01)
(52) U.S. Cl. ....................................... 429/34
(58) Field of Classification Search ................... 429/30, 429/34
See application file for complete search history.

(56) References Cited

U.S. PATENT DOCUMENTS

2003/0031908 A1* 2/2003 Bostaph et al. ............... 429/30
2003/0215342 A1* 11/2003 Higashino et al. ............ 417/322
2004/0200724 A1* 10/2004 Fujii et al. .................... 204/601
2006/0006108 A1* 1/2006 Arias et al. ................... 210/232

FOREIGN PATENT DOCUMENTS

| JP | 09-161822 | 6/1997 |
|----|-----------|--------|
| JP | 2003-132924 | 5/2003 |
| JP | 2003-346836 | 12/2003 |
| JP | 2003-346846 | 12/2003 |
| WO | WO 03/015204 A1 | 2/2003 |

* cited by examiner

*Primary Examiner*—Patrick Ryan
*Assistant Examiner*—Muhammad Siddiquee
(74) *Attorney, Agent, or Firm*—Brinks Hofer Gilson & Lione

(57) ABSTRACT

A fuel cell device has a small and compact structure as a whole. The fuel cell device employs a fuel cell (e.g., direct methanol fuel cell of an MEA structure) using liquid fuel. Diluted liquid fuel is prepared by diluting the liquid fuel (methanol-contained liquid in the case of DMFC) with dilution liquid, and is supplied to the fuel cell. A first pump unit stacked on the fuel cell supplies the diluted liquid fuel to the fuel cell while diluting the liquid fuel by mixing the liquid fuel and the dilution liquid together. A second pump unit stacked on the fuel cell collects liquid (water usable as dilution liquid in DMFC) produced by an electrochemical reaction in the fuel cell.

19 Claims, 14 Drawing Sheets

LIQUID MIXING PASSAGE

FUEL CELL DEVICE

CROSS-REFERENCE TO RELATED APPLICATION

This application is based on Japanese patent application No. 2004-178549 filed in Japan on Jun. 16, 2004, the entire content of which is hereby incorporated by reference.

BACKGROUND OF THE INVENTION

1. Field of the Invention

The present invention relates to a fuel cell device, and particularly to a fuel cell device utilizing a fuel cell such as a Direct Methanol Fuel Cell (DMFC), which uses liquid fuel as its fuel.

2. Description of the Related Art

It has been increasingly required to increase lives of cells and batteries in accordance with start of a ubiquitous society. Conventional lithium cells have been developed to an extent close to a theoretical limit, and it is becoming difficult to expect significant improvement of performances. Under such circumstances, attention is being given to fuel cells, which can have significantly increased life owing to its high energy density per weight (volume) as compared with conventional cells.

Among fuel cells, attention has been particularly given to Direct Methanol Fuel Cells (DMFCs), and research has been extensively conducted on such fuel cells because the DMFC has such features that (1) the structure is simple, (2) the fuel can be obtained without large-scale upgrading of infrastructure and (3) it has an inexpensive structure operating at a low temperature, and therefore can be suitably used as fuel cells, e.g., for portable devices such as notebook-size computers, cellular phones and others.

Fuel cell devices employing the DMFC fuel cells can be classified into two types according to the manner of fuel supply. One of the types is referred to as an active type, in which a pump is used for supplying fuel to the cell. The other type is referred to as a passive type, in which a pump is not used, and a capillary force or the like is used for supplying fuel.

Reaction formulas of the DMFC are as follows:

Reaction on fuel electrode side:

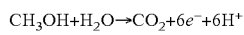

$$CH_3OH + H_2O \rightarrow CO_2 + 6e^- + 6H^+$$

Reaction on air electrode side:

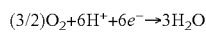

$$(3/2)O_2 + 6H^+ + 6e^- \rightarrow 3H_2O$$

Overall reaction:

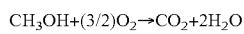

$$CH_3OH + (3/2)O_2 \rightarrow CO_2 + 2H_2O$$

According to the above reaction formulas, equimolar reaction occurs between methanol and water to produce $CO_2$ and two molecules of $H_2O$. However, a low-concentration aqueous methanol solution having a concentration from 3% to 5% is usually used as the fuel, which is actually supplied to a fuel electrode. The purpose of this is to prevent a crossover phenomenon, in which methanol moves to an air electrode after passing through an electrolyte membrane without causing the above reaction on the fuel electrode. The crossover phenomenon occurs more easily with increase in methanol concentration of the fuel. If the crossover phenomenon occurs, the reaction, which must occur on the fuel electrode of the DMFC, also occurs on the air electrode of the DMFC so that the fuel is wasted, and the cell efficiency remarkably lowers due to lowering of the potential on the air electrode side. Accordingly, the low-concentration aqueous methanol solution is usually used.

In the DMFC, a low-concentration aqueous methanol solution is supplied to the fuel electrode as described above. In the active type of the fuel cell device, such a system of a fuel dilution circulation type can be achieved that water produced on the air electrode side and liquid moving from the fuel electrode side are collected, and high-concentration aqueous methanol solution is supplied to the fuel electrode side while diluting it with the liquid thus collected.

The inventors can represent by way of example a generator system shown in FIG. 15. In the system shown in FIG. 15, a load L to be energized is connected to a fuel cell C. A fuel tank t1, a recovery tank t2 and a mixer (mixing tank) MX are arranged outside the cell, and are connected to the fuel cell C via pipes. The water produced on the air electrode side of the fuel cell C and the liquid moving from the fuel electrode side are collected by a pump PM3 into the recovery tank t2. For power generation, a pump PM1 supplies high-concentration aqueous methanol solution from the fuel tank t1 to the mixer MX, and pump PM2 supplies dilution liquid containing water from the recovery tank t2 to the mixer MX. In the mixer MX, the aqueous methanol solution and the dilution liquid are mixed to dilute the high-concentration aqueous methanol solution, and the aqueous methanol solution thus diluted is supplied to the fuel electrode of the cell. A surplus portion of the fuel supplied to the fuel electrode returns into recovery tank t2.

For optimizing the methanol concentration of the fuel supplied to the fuel electrode, the following manner may be employed. A concentration sensor DS detects the methanol concentration of the fuel flowing from the mixer MX to the cell, and a controller CONT controls operations of the pumps PM1 and PM2 based on the value detected by the sensor DS. Thereby, the controller CONT can control a rate in amount between the high-concentration aqueous methanol solution and the dilution liquid to be supplied to the mixer.

The above system can increase the methanol concentration of the fuel in the fuel tank, and can use, e.g., 60 wt % aqueous methanol solution. In this case, the fuel tank can be reduced substantially by a factor from 20 to 12, as compared with the case of using 3 wt %-5 wt % aqueous methanol solution.

Japanese Laid-Open Patent Publication No. 2003-132924 has disclosed another structure, in which a high-concentration aqueous methanol solution is supplied to a dilution tank from a methanol tank via a valve connected to the methanol tank, and water produced by an air electrode of a fuel cell body is collected into a dilution tank. In the dilution tank, the aqueous methanol solution supplied from the methanol tank is diluted with the collected water, and the aqueous methanol solution thus diluted is supplied to a fuel electrode of the cell.

Such a structure is also disclosed that a methanol concentration of the aqueous methanol solution in the dilution tank is detected, and a degree of opening of the valve is controlled based on a result of the detection. Thereby, an amount of the high-concentration aqueous methanol solution supplied from the methanol tank to the dilution tank is controlled so that the methanol concentration of the aqueous methanol solution supplied to the fuel electrode is controlled.

Japanese Laid-Open Patent Publication No. 2003-346846 has disclosed the following structure. A mixing chamber is provided outside a cell body. The mixing chamber is supplied with methanol from a methanol tank, and is also supplied with unused aqueous methanol solution and a by-product from the cell body. A circuit is provided for sending the fuel in the mixing chamber to the cell. The fuel is circulated through this circuit by increasing or decreasing a capacity or volume of a fuel inlet chamber of the cell body or a liquid path communicated with the fuel inlet chamber by a piezoelectric actuator provided for the chamber or the path. In this fuel cell device, high-concentration aqueous methanol solution is kept in the methanol tank. It is considered that the high-concentration aqueous methanol solution can be diluted with water returned from the cell body into the mixing chamber for using the aqueous methanol solution thus diluted as the fuel.

However, the fuel cell device of the active type shown by way of example in FIG. 15 requires three pumps for fuel supply, dilution liquid supply and liquid recovery in addition to the cell body, and further requires a mixing mechanism (mixer) for the high-concentration aqueous methanol solution and the dilution liquid. Therefore, the device has a large and complicated structure, and thus is not suitable for, e.g., a cell device of a portable device.

For suppressing increase in size of the fuel cell device, the device may be of a high-concentration aqueous methanol solution dilution type, which employs a passive-type DMFC not requiring a pump. However, this system structure cannot positively control flow rates of liquids.

Further, the fuel cell devices disclosed in Japanese Laid-Open Patent Publication Nos. 2003-132924 and 2003-346846 require a mixing mechanism (mixing tank) for mixing the high-concentration aqueous methanol solution and the water, in addition to the fuel cell body. This mechanism also increases the device sizes.

Several problems have been discussed primarily in connection with the fuel cell devices of such a type that the DMFC is employed, and the methanol solution is diluted with dilution liquid containing water for supplying the diluted fuel to the fuel electrode of the cell. In general, the fuel cell device of the type, in which liquid fuel is used in the fuel cell, and is diluted with dilution liquid for supplying the diluted liquid fuel to the cell, requires the mixing mechanism (e.g., mixing tank) for mixing the liquid fuel and the dilution liquid in addition to the fuel cell body, and this mixing mechanism increases the sizes of the fuel cell device.

SUMMARY OF THE INVENTION

An object of the invention is to provide a fuel cell device, which employs a fuel cell using liquid fuel, and supplies the liquid fuel diluted with dilution liquid to the cell, and particularly to provide the fuel cell device, of which whole structure can be more compact and smaller than that of a conventional fuel cell device of the same type.

Another object of the invention is to provide, as an example of the above fuel cell device, a fuel cell device of a type, in which a direct methanol fuel cell (DMFC) is used, methanol-contained liquid fuel used as liquid fuel is diluted with dilution liquid containing water, and the liquid fuel thus diluted is supplied to the fuel cell, and particularly to provide the fuel cell device, of which whole structure can be more compact and smaller than that of a conventional fuel cell device of the same type.

The invention provides a fuel cell device employing a fuel cell using liquid fuel and being supplied with diluted liquid fuel prepared by diluting the liquid fuel with dilution liquid, and including the fuel cell, and a first pump unit stacked on the fuel cell. The first pump unit supplies the diluted liquid fuel to a fuel electrode of the fuel cell while diluting the liquid fuel by mixing the liquid fuel and the dilution liquid with each other.

Also, the invention provides the fuel cell device, in which the fuel cell is a direct methanol fuel cell, the liquid fuel is methanol-contained liquid fuel, and the dilution liquid contains water.

In the fuel cell device according to the invention, the first pump unit is configured to supply the diluted liquid fuel to the fuel cell while diluting the liquid fuel by mixing the liquid fuel and the dilution liquid together, and is stacked on the fuel cell to provide an integrated structure together with the fuel cell. Therefore, such a structure is not required that a mixing mechanism for mixing the liquid fuel and the dilution liquid together is located outside the fuel cell, and is spaced therefrom, and a pipe for connection between the mixing mechanism and the fuel cell is not required. Accordingly, the whole fuel cell device can have a compact and small structure.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11(A) shows a liquid discharging operation, FIG. 11(B) shows a liquid pulling operation, FIG. 11(C) shows a waveform of a voltage applied to a piezoelectric element for the liquid discharging operation and pulling operation, FIG. 11(D) shows a liquid discharging operation in a direction opposite to that in FIG. 11(A), FIG. 11(E) shows a liquid pulling operation in a direction opposite to that in FIG. 11(B), and FIG. 11(F) shows a waveform of a voltage applied to the piezoelectric element for these operations in the opposite direction.

DESCRIPTION OF THE PREFERRED EMBODIMENTS

Figure 1:
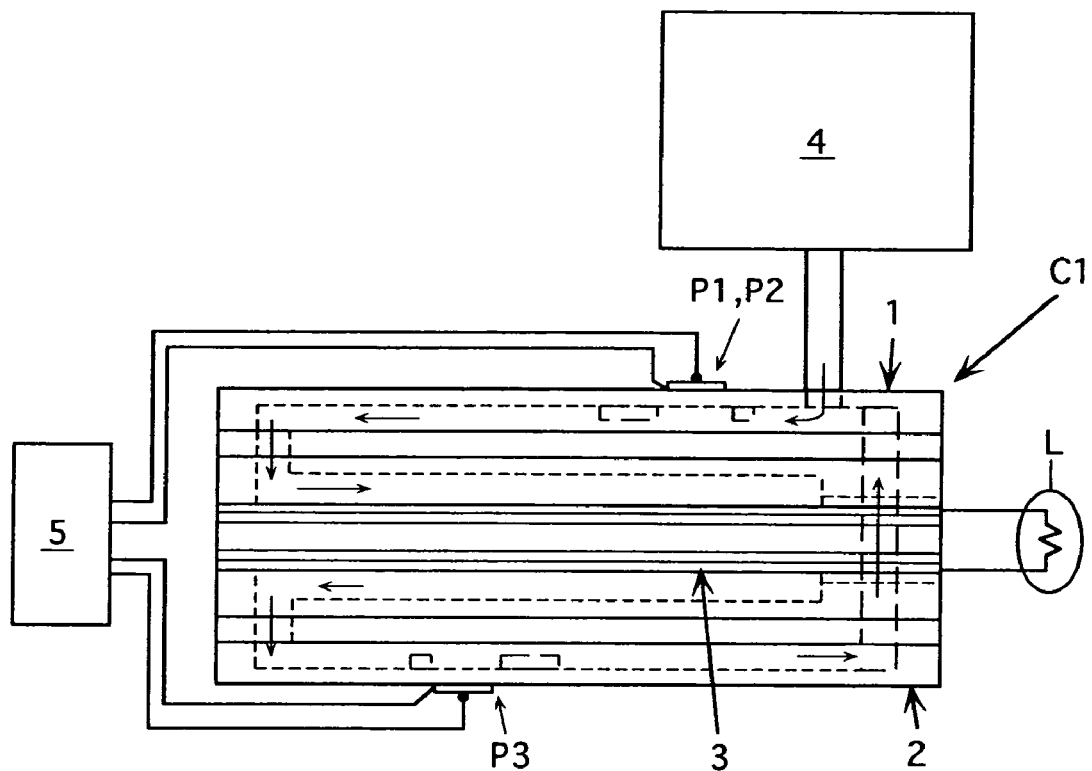
FIG. 1 shows a power generation system utilizing a fuel cell device according to a first embodiment of the invention.

A fuel cell device according to each embodiment of the invention employs a fuel cell using liquid fuel, dilutes the liquid fuel with dilution liquid and supplies the diluted liquid fuel to the fuel cell. Basically, the fuel cell device includes the fuel cell, and a first pump unit stacked on the fuel cell. The first pump unit supplies the diluted liquid fuel to a fuel electrode of the fuel cell while diluting the liquid fuel by mixing the liquid fuel and the dilution liquid together.

In this fuel cell device, the first pump unit supplies the diluted liquid fuel to the fuel cell while diluting the liquid fuel by mixing the liquid fuel and the dilution liquid together. Also, the first pump unit is stacked on the fuel cell to from an integrated structure together with the fuel cell. Accordingly, such a structure is not required that a mixing mechanism for mixing the liquid fuel and the dilution liquid is arranged outside the fuel cell with a space therebetween. Also, a pipe connecting the mixing mechanism and the fuel cell is not required. This can provide a compact and small structure of the whole fuel cell device, and allows use of the fuel cell device, e.g., as a power source of a portable device.

In this fuel cell device, a second pump unit may be stacked on a surface of the fuel cell opposite to the surface carrying the first pump unit. In this structure, the second pump unit may collect liquid produced by an electrochemical reaction in the fuel cell and liquid moving from the fuel electrode side of the fuel cell through an electrolyte layer of the fuel cell toward an air electrode side of the fuel cell.

Since the second pump unit is likewise stacked on the fuel cell to form the integrated structure together with the fuel cell, provision of the second pump unit does not impede the reduction in size of the fuel cell device. Since the second pump unit collects the liquid produced by the electrochemical reaction in the fuel cell and the liquid moving from the fuel electrode side of the fuel cell through the electrolyte layer toward the air electrode side, these kinds of liquid do not cover a catalyst surface of an air electrode of the cell, and supply of the air (oxygen) is not prevented so that the device can maintain a good power generating performance.

If possible, the dilution liquid may be formed of the above liquid produced by the electrochemical reaction in the fuel cell and the liquid moving from the fuel electrode side of the fuel cell through the electrolyte layer of the fuel cell toward the air electrode side of the fuel cell. In this case, the second pump unit may collect the liquid produced by the electrochemical reaction in the fuel cell and the liquid moving from the fuel electrode side through the electrolyte layer toward the air electrode side, and may supply these kinds of liquid as the dilution liquid to the first pump unit via a dilution liquid circulation passage formed in a structure including the fuel cell, the first pump unit and the second pump unit stacked together.

Alternatively, the second pump unit may collect the liquid produced by the electrochemical reaction in the fuel cell and the liquid moving from the fuel electrode side through the electrolyte layer toward the air electrode side, and may feed these kinds of liquid to a recovery container, the first pump unit may be supplied with the dilution liquid from the recovery container.

In the structure provided with the recovery container, the first pump unit may feed excessive diluted liquid fuel to the recovery container.

A liquid fuel container may be provided for the liquid fuel not yet diluted, and the liquid fuel not yet diluted may be supplied from the liquid fuel container to the first pump unit. The liquid fuel container may be typically an exchangeable container, e.g., of a cartridge type.

For simplifying an arrangement of liquid passages, and thereby further reducing sizes of the fuel cell device, the following structures may be preferably employed.

The first pump unit stacked on the fuel cell neighbors on the fuel electrode. If this structure employs the second pump unit, the second pump unit stacked on the fuel cell may neighbor on the air electrode.

If necessary, depending on the structure of the fuel cell or the like, an electrode layer electrically connected to the fuel electrode may be formed on a surface of the first pump unit opposed to the fuel electrode. Likewise, an electrode layer electrically connected to the air electrode may be formed on a surface of the second pump unit opposed to the air electrode.

In any one of the foregoing and other cases, it is preferable that each of the fuel cell, the first pump unit and the second pump unit (if employed) has a flat form for further reducing the sizes of the fuel cell device. Thereby, the invention can provide the fuel cell device of the active type, which can have the sizes substantially equal to those of a device of a passive type.

In any one of the foregoing and other structures, the following typical example of the first pump unit may be employed if the first pump unit stacked on the fuel cell neighbors on the fuel electrode. This first pump unit is provided with a diluted liquid fuel passage opposed to the fuel electrode for supplying the diluted liquid fuel to the fuel electrode, is provided at a portion opposite to the diluted liquid fuel passage opposed to the fuel electrode with a liquid fuel supply passage including a micropump for supplying the liquid fuel, a dilution liquid passage including a micropump for supplying the dilution liquid, and a liquid mixing passage communicated with both the liquid fuel supply passage and the dilution liquid supply passage, and communicated with the diluted liquid fuel passage. The first pump unit may have a gas-draining vent for discharging a gas generated around the fuel electrode through the diluted liquid fuel passage.

Since this first pump unit is provided with the diluted liquid fuel passage opposed to the fuel electrode for supplying the diluted liquid fuel to the fuel electrode, it can function as a separator on the fuel electrode side in a conventional fuel cell device.

A conductive layer may be formed on a surface opposed to the fuel electrode and having the diluted liquid fuel passage, and may be used as an electrode.

The first pump unit can have a flat form and thus a thin form, as will be described later.

In the structure having the second pump unit stacked on the fuel cell and neighboring on the air electrode, a typical example of the second pump unit may have the following structure. The second pump unit is provided with a passage opposed to the air electrode for the liquid produced by the electrochemical reaction in the fuel cell and the liquid moving from the fuel electrode side of the fuel cell through the electrolyte layer of the fuel cell toward the air electrode side of the fuel cell, is provided at a portion opposite to the passage opposed to the air electrode with a liquid collecting passage including a micropump for collecting the liquid, has a passage extending from the liquid passage opposed to the air electrode to the liquid collecting passage. The second pump unit may have an air intake for supplying an external air to the air electrode via the liquid passage.

Since this second pump unit is provided with the passage opposed to the air electrode for the produced liquid and others, it can function as a separator on the air electrode side in a conventional fuel cell device.

A conductive layer may be formed on a surface opposed to the air electrode and having the liquid passage, and may be used as an electrode.

The second pump unit can have a flat form and thus a thin form, as will be described later.

In any one of the foregoing and other structures, each of the micropumps typically includes a first restrictor passage for drawing in the liquid, a second restrictor passage for discharging the liquid, a pump chamber located between the first and second restrictor passages, and a piezoelectric element arranged on a flexible wall of the pump chamber operable as a diaphragm. The piezoelectric element vibrates the pump chamber wall to shrink and expand the pump chamber for drawing the liquid from the first restrictor passage into the pump chamber and discharging the liquid from the pump chamber through the second restrictor passage.

The micropump can likewise has a flat and thin form, as will be described later.

In any one of the foregoing and other structures, the fuel cell is typically a DMFC (Direct Methanol Fuel Cell), which is suitable, e.g., for a portable device such as a notebook-size computer, a cellular phone or the like because it has such features that (1) the structure is simple, (2) the fuel can be obtained without large-scale upgrading of infrastructure and (3) it has the inexpensive structure operating at a low temperature.

In the case of using the above DMFC, the liquid fuel is methanol-contained liquid fuel (e.g., high-concentration aqueous methanol solution), and the dilution liquid is liquid containing water. Water produced around the air electrode of the DMFC and liquid moving from the fuel electrode side can be used as the dilution liquid.

For reducing sizes of the fuel cell device, the structure employing the DMFC preferably has a so-called MEA (Membrane Electrode Assembly) structure, which allows a flat and thin structure. In the MEA structure, an electrolyte membrane is held between the fuel electrode and the air electrode.

Some examples of the fuel cell device will now be described with reference to the drawings.

<Fuel Cell Device C1>

FIG. 1 shows a power generation system using a fuel cell device C1.

The fuel cell device C1 includes a fuel cell 3, and also includes first and second pump units 1 and 2 stacked on and fixed to the cell 3.

Figure 2A:
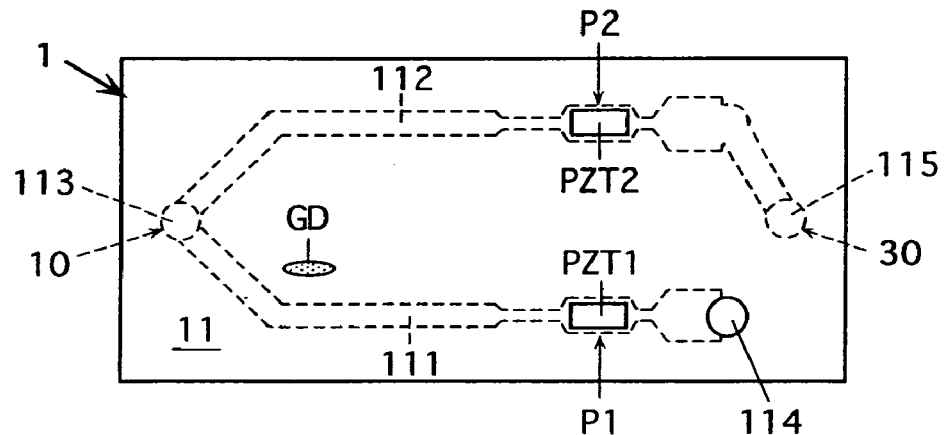
FIGS. 2(A), 2(B) and 2(C) are a plan, a side view and a bottom view of the fuel cell device of the first embodiment of the invention, respectively.
Figure 2B:
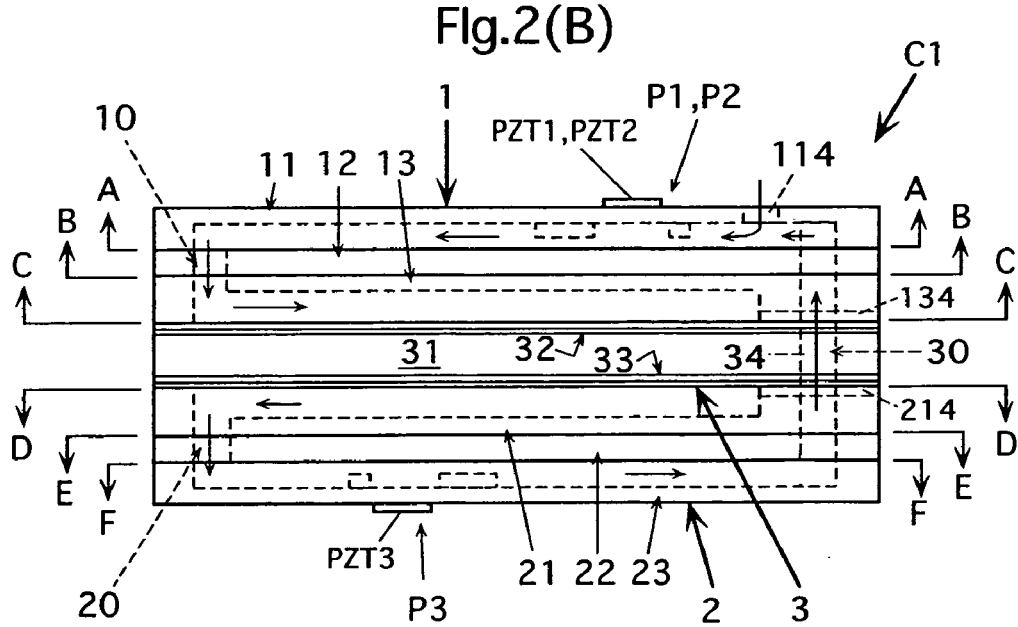
Figure 2C:
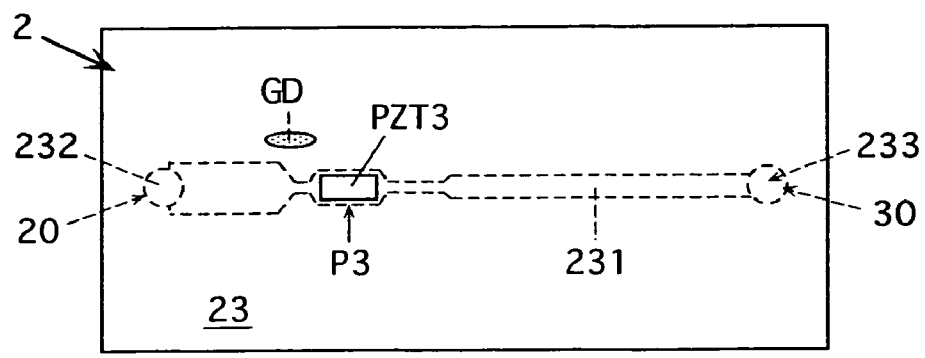

FIG. 2 shows the fuel cell device C1. More specifically, FIGS. 2(A), 2(B) and 2(C) are a plan, a side view and a bottom view of the device C1, respectively.

FIGS. 3(A), 3(B), 3(C), 3(D), 3(E) and 3(F) are cross sections taken along lines A-A, B-B, C-C, D-D, E-E and F-F in FIG. 2(B), respectively.

In the following description, the fuel cell 3 is a direct methanol fuel cell, which may also be referred to as a "DMFC" hereinafter, and has a MEA (Membrane Electrode Assembly) structure, in which fuel electrode 32 and air electrode 33 are joined to the opposite surfaces of an electrolyte membrane 31, respectively. Although various kinds of MEA structures have been known, the electrolyte membrane 31 in this example is a polymer electrolyte membrane (e.g., Nafion (perfluoro-sulfonic acid membrane) manufactured by DuPont Corp.). The fuel electrode 32 is formed of a catalyst layer (e.g., platinum black or platinum alloy carried by carbon black), which is in contact with the electrolyte membrane 31, and an electrode, e.g., of carbon paper or the like stacked or layered on the catalyst layer. Likewise, the air electrode 33 is formed of a catalyst layer in contact with the electrolyte membrane 31 and a similar electrode layered on the catalyst layer.

Depending on the structure of the MEA, an electrode layer for power output may be formed on at least one of the first and second pump units 1 and 2.

The above electrode layer may be formed by employing such a structure that a member having a liquid passage of the pump unit, which is opposed to the fuel electrode or the air electrode, is formed of an electrically conductive material (e.g., by etching of stainless steel, electroforming of Ni or the like). If the member is made of an insulating material, the electrode layer may be made of platinum or the like by utilizing a thin-film forming method such as sputtering effected on a surface of a member portion having the liquid passage. For connection between the electrode layer and the fuel electrode or the air electrode (oxygen electrode), an electrically conductive adhesive may be used, or the pump unit may be held on the fuel electrode or the air electrode in a pressed state by a frame or another component member.

Figure 3A:
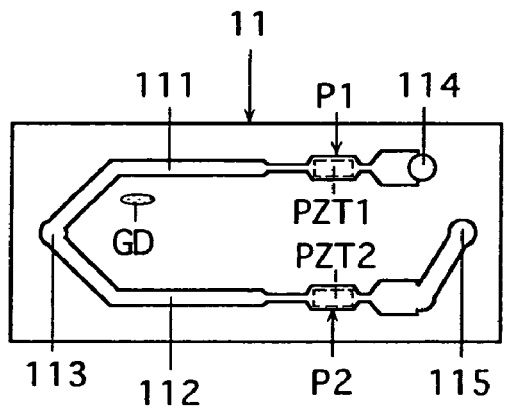
FIGS. 3(A), 3(B), 3(C), 3(D), 3(E) and 3(F) are cross sections taken along lines A-A, B-B, C-C, D-D, E-E and F-F in FIG. 2(B)

The first pump unit 1 includes flat square members 11, 12 and 13. These members are stacked together to form a flat structure. As shown in FIGS. 2(A) and 3(A), the member 11 is provided at a surface opposed to the lower member 12 with a liquid fuel supply passage 111 including a micropump P1, a dilution liquid supply passage 112 including a micropump P2, and a common liquid mixing passage 113, which is in communication with these supply passages 111 and 112. The liquid supply passages 111 and 112 are formed of grooves opened toward the lower member 12, and the mixing passage 113 is formed of a concavity opened toward the lower member 12.

The mixing passage 113 is located downstream from the pumps P1 and P2. The liquid fuel supply passage 111 is provided at its upstream end with a liquid fuel supply port 114. The dilution liquid supply passage 112 is provided at its upstream end, which is upstream to the pump P2, with dilution liquid receiver 115. The dilution liquid receiver 115 is formed of a concavity opened toward the lower member 12.

Figure 3B:
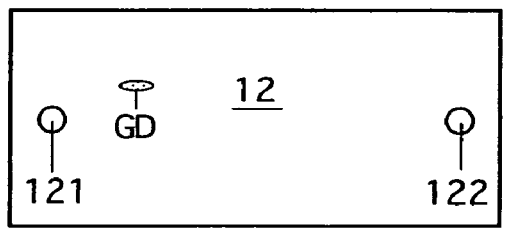
Figure 3C:
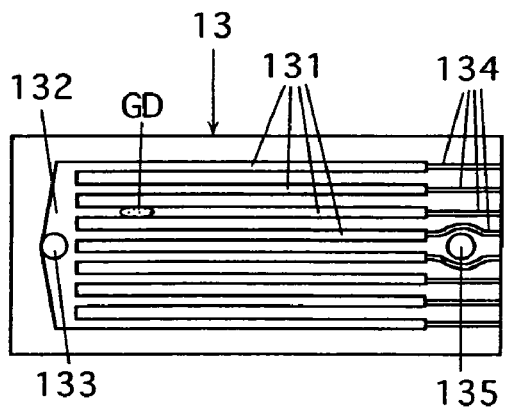

As shown in FIG. 3(C), the member 13 is provided at its surface opposed to the fuel electrode 32 of the cell 3 with a plurality of diluted liquid fuel passages 131, which are arranged in a comb-like fashion and each have a groove-like form, for supplying the diluted liquid fuel to the fuel electrode 32 as well as a diluted liquid fuel passage 132, which is communicated with the plurality of passages 131 and has a concave form. A through hole 133 extends from the passage 132 toward the member 12. Further, groove-like gas-discharging vents 134 are formed for externally connecting the passages 131. A through hole 135 extending to the member 12 is formed between the vents 134. The vents 134 are used for discharging carbon dioxide gas produced on the fuel electrode side.

As shown in FIG. 3(B), the middle member 12 has a through hole 121 at a position matching with the mixing passage 113 in the member 11 and the through hole 133 in the member 13, and also has a through hole 122 at a position matching with the dilution liquid receiver 115 in the member 11 and the through hole 135 in the member 13.

The through hole 121 in the member 12 and the through hole 133 in the member 13 form a through passage 10 extending from the mixing passage 113 in the member 11 to the diluted liquid fuel passages 132 and 131 in the member 13 (see FIGS. 1 and 2(B)).

Figure 3D:
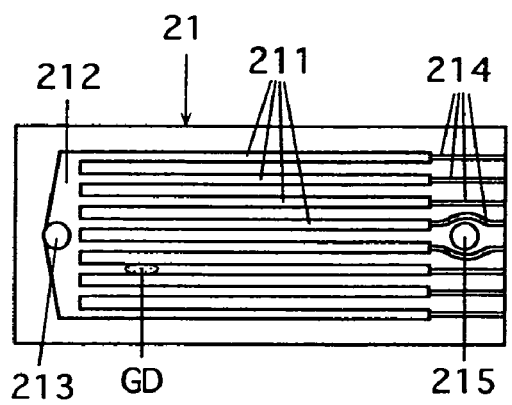
Figure 3E:
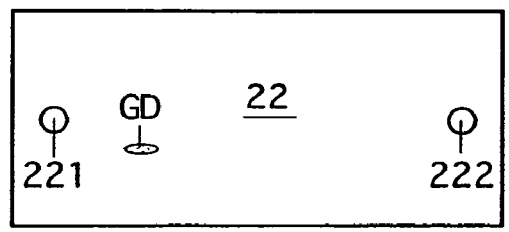

In addition to the above, the members 11, 12 and 13 have gas flowing portions GD matching with each other as shown in FIGS. 3(A)-3(C), respectively. The gas flowing portions GD are formed of a plurality of minute gas flowing holes h, which are finished by water-repellent processing for preventing flow of liquid, as shown in FIG. 3(G). At least one (more preferably, two or more) gas flowing portion GD is preferably arranged to match with the diluted liquid fuel passage 131 (see FIG. 3(C)). The gas flowing portion GD in the first pump unit 1 is provided for discharging a gas.

The second pump unit 2 includes flat square members 21, 22 and 23. These members are layered together to form a flat structure. As shown in FIG. 3(D), the member 21 is provided at a surface opposed to the air electrode 33 of the cell 3 with passages for flowing liquid (water) produced by an electrochemical reaction in the fuel cell 3 and liquid flowing from the fuel electrode side (32) through the electrolyte membrane 31 toward the air electrode side (33), and more specifically, is provided with a plurality of passages 211, which are arranged in a comb-like fashion and each have a groove-like form, and a passage 212, which is arranged commonly to these passages 211 and has a concave form. A through hole 213 extends from the passage 212 toward the member 22. Further, groove-like air intakes 214 are formed for externally connecting each passage 211. A through hole 215 extending toward the member 22 is formed between the air intakes 214.

Figure 3F:
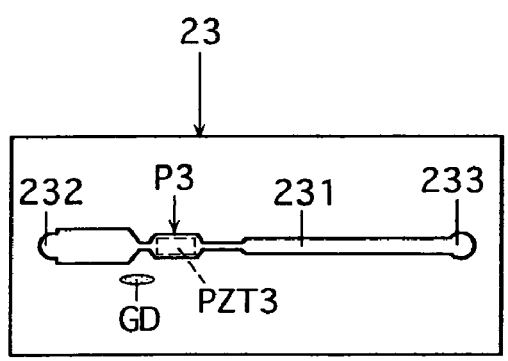
Figure 3G:
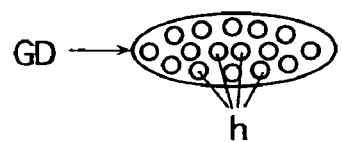
FIG. 3(G) shows, on an enlarged scale, a gas passage portion.

As shown in FIGS. 2(C) and 3(F), the member 23 is provided at its surface opposed to the member 22 with a groove-like liquid collecting passage 231 including a micropump P3. The liquid collecting passage 231 is configured to collect the liquid (water) produced by the electrochemical reaction in the fuel cell 3 and the liquid flowing from the fuel electrode side (32) through the electrolyte membrane 31. The liquid collecting passage 231 is provided at its upstream end, which is upstream to the pump P3, with a concave liquid receiver 232, and is provided at its downstream end with a concave liquid discharging portion 233.

The middle member 22 is provided with a through hole 221, which is formed at a position matching with the through hole 213 in the member 21 and the liquid receiver 232 in the member 23, and is also provided with a through hole 222, which is formed at a position matching with the through hole 215 in the member 21 and the liquid discharging portion 233 in the member 23.

The through holes 213 and 221 in the members 21 and 22 form a passage 20 for introducing the liquid such as liquid produced on the air electrode side (33) from the liquid passages 211 and 212 in the member 21 to the liquid receiver 232 at the end of the liquid collecting passage 231 in the member 23 (see FIGS. 1 and 2(B)).

In addition to the above structures, the members 21, 22 and 23 are provided with the gas flowing portions GD at the positions matching with each other, as shown in FIGS. 3(D)-3(F). The gas flowing portions GD are substantially the same as those in the first pump unit 1, and at least one (preferably two or more) gas flowing portion GD is preferably arranged to match with, e.g., the liquid passage 211 (see FIG. 3(D)). These gas flowing portions GD are utilized for taking in an external air.

A circulation passage 30 is formed of the dilution liquid receiver 115 in the member 11, the through hole 122 in the member 12 and the through hole 135 in the member 13 of the first pump unit 1, and a through liquid passage 34 (see FIG. 2(B)) formed in one end of the cell 3, and the through hole 215 in the member 21, the through hole 222 in the member 22 and the liquid discharging portion 233 in the member 23 of the second pump unit 2. The circulation passage 30 supplies the water produced by the electrochemical reaction in the cell 3 and the liquid moving from the fuel electrode side to the first pump unit 1 as the dilution liquid (see FIGS. 1 and 2(B)).

Figure 11A:
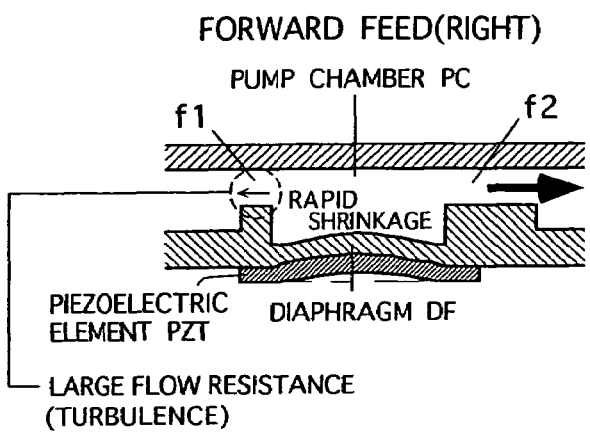
FIGS. 11(A) to 11(F) show by way of example a basic structure and a basic operation of a micropump.
Figure 11D:
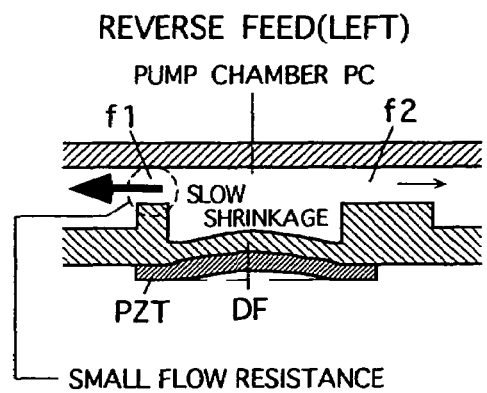
Figure 11B:
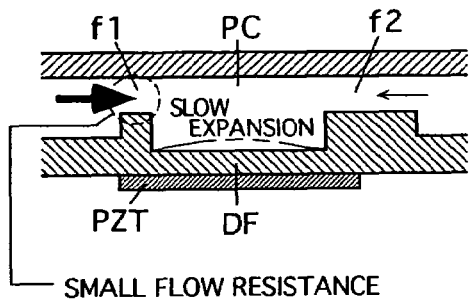

Each of the micropumps P1 and P2 in the first pump unit 1 and the micropump P3 in the second pump unit 2 has a basic structure shown in FIGS. 11(A) and 11(B).

Each of these micropumps P1, P2 and P3 has a first restrictor passage f1 for drawing in the liquid, a second restrictor passage f2 for discharging the liquid, a pump chamber PC between the first and second restrictor passages f1 and f2, and a piezoelectric element PZT arranged on a flexible wall (diaphragm) DF of the pump chamber PC.

An alternating voltage is applied to the piezoelectric element PZT to vibrate the pump chamber wall (diaphragm) DF so that the pump chamber PC shrinks and expands to draw the liquid from the first restrictor passage f1 into the pump chamber PC and to discharge the liquid from the pump chamber PC through the second restrictor passage f2.

More specifically, the first and second restrictor passages f1 and f2 have the same or substantially the same sectional area, but the passage f2 is longer than the passage f1. The alternating voltage driving the piezoelectric element PZT rapidly rises and slowly falls as shown in FIG. 11(C).

As shown in FIG. 11(A), when the applied voltage rapidly rises, the piezoelectric element rapidly deforms the diaphragm DF to shrink rapidly the pump chamber PC. Thereby, a laminar flow of the liquid occurs in the long passage f2 as a result of the flow resistance. On the other hand, a turbulent flow occurs in the short passage f1 so that the flow of the liquid from the passage f1 is suppressed. Thereby, the liquid can be discharged from the pump chamber through the passage f2.

As shown in FIG. 11(B), when the applied voltage falls slowly, the piezoelectric element slowly restores the diaphragm DF to expand slowly the pump chamber PC. Thereby, the liquid flows from the short passage f1 into the pump chamber PC, and the discharging of the liquid from the long passage f2 is suppressed because the passage f2 exhibits a larger flow resistance than the passage f1. Thereby, the liquid can be drawn from the passage f1 into the pump chamber PC.

Accordingly, the liquid can be sent in an intended direction by such an arrangement that the passage f1 is located upstream to the passage f2 in the intended flow direction. The pumps P1, P2 and P3 have the basic structures described above, and feed the liquid on the foregoing operation principle. In FIGS. 1 to 3(F), the piezoelectric elements of the pumps P1, P2 and P3 are indicated by PZT1, PZT2 and PZT3, respectively.

Each of the pumps P1, P2 and P3 has intended discharging (liquid feeding) performances, which are achieved by appropriately selecting one or more of the pump chamber capacity, the performance of the piezoelectric element, the sectional area and length of each of the first and second restrictor passages, the voltage applied to the piezoelectric element and others.

In this example, the discharging (liquid feeding) performances of the pumps P1, P2 and P3 are determined so that the liquid fuel and the dilution liquid can be mixed at an intended rate for dilution.

Figure 11E:
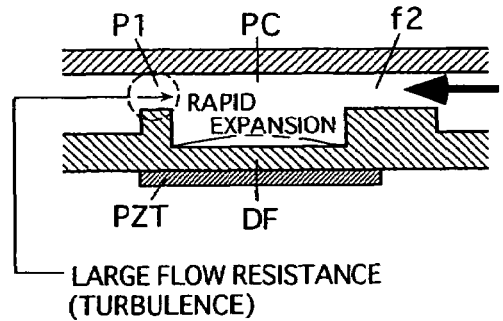
Figure 11C:
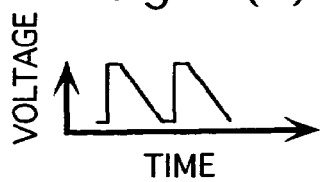
Figure 11F:
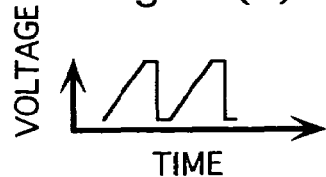

By applying the alternating voltage, which slowly rises and rapidly falls as shown in FIG. 11(F), to the piezoelectric element PZT, the micropump having the basic structure shown in FIGS. 11(A) and 11(B) can operate to discharge the liquid from the passage f1 as shown in FIG. 11(D), and to draw the liquid from the passage f2 as shown in FIG. 11(E). In this example, a drive waveform shown in FIG. 11(C) is employed.

As shown in FIG. 1, an exchangeable liquid fuel container 4 of a cartridge type is connected to liquid fuel supply port 114 in the member 11 of the first pump unit 1.

The micropumps P1, P2 and P3 can be driven by a pump drive portion 5, which can apply the alternating voltage of the waveform shown in FIG. 11(C) to the piezoelectric elements of the pumps P1, P2 and P3.

According to the fuel cell device C1, methanol-contained liquid (e.g., high-concentration aqueous methanol solution) is supplied as the liquid fuel to the first pump unit 1 from the liquid fuel container 4, and the pump drive portion 5 applies the alternating voltages to the piezoelectric elements PZT1-PZT3 of the pumps P1-P3, respectively, so that the pumps are driven and the fuel cell 3 is supplied with the diluted fuel, and the following reaction occurs in the cell 3:

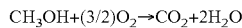

Thereby, the power is generated, and the cell 3 can supply the power to the load L connected thereto.

In an initial stage of use of the fuel cell device C1, the cell 3 is supplied with the diluted fuel having an appropriate concentration. This diluted fuel is prepared by diluting the liquid fuel supplied from the container 4 with the water, which is already kept in the dilution liquid supply passage for initial dilution. The water for initial dilution can be supplied from a water supply port (not shown) connected to the dilution liquid supply passage. This water supply port is usually closed.

Then, the second pump unit 2 starts to supply the water produced on the air electrode side (33) by the electrochemical reaction of the cell 3 and liquid moving from the fuel electrode 32 toward the air electrode 33 to the first pump unit 1. The first pump unit 1 dilutes the methanol-contained liquid fuel supplied from the container 4 with the dilution liquid supplied from the second pump unit 2 by mixing them together, and thereby can supply the diluted liquid fuel thus produced to the fuel cell 3. Thereby, the power generation can be performed for a long time with the raw fuel contained in the container 4.

The fuel cell device C1 described above has a compact and flat form as a whole, and can be configured to have, e.g., a card-like form, which is suitable for a power source of a portable device and others.

<Fuel Cell Device C1'>

For example, in the fuel cell device C1 described above, as shown in FIGS. 4(A) to 4(C) and FIGS. 5(A) to 5(D), the first and second pump units 1 and 2 may be replaced with first and second pump units 1' and 2' to provide a fuel cell device C1', respectively.

Figure 4A:
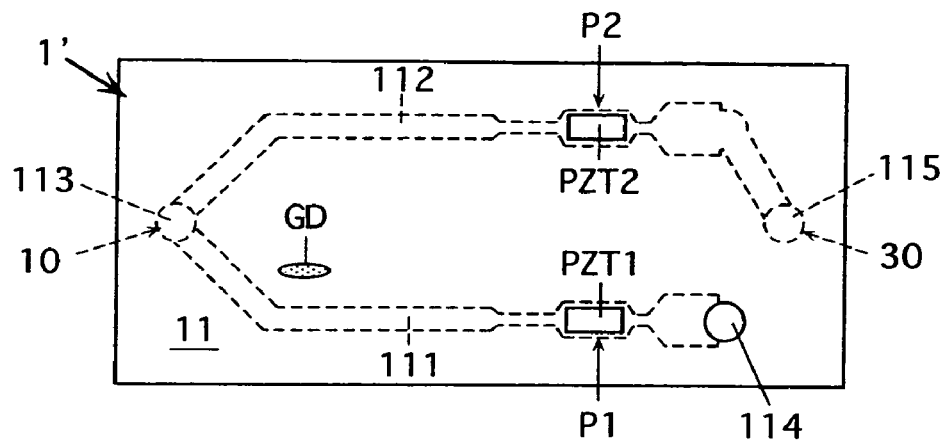
FIGS. 4(A), 4(B) and 4(C) are a plan, a side view and a bottom view of a fuel cell device of a modification of the fuel cell device shown in FIGS. 2(A), 2(B) and 2(C), respectively.
Figure 4B:
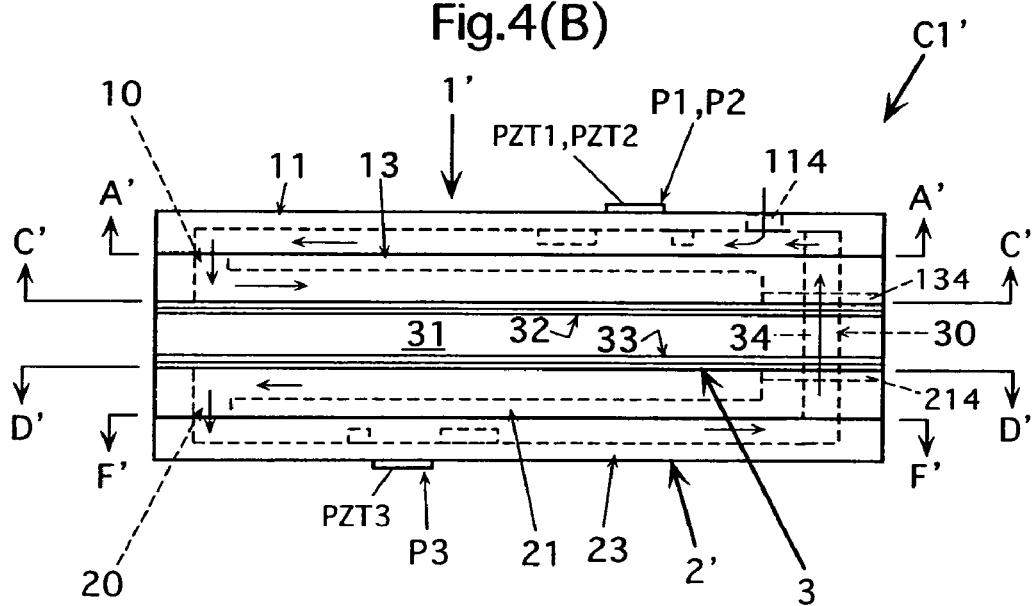
Figure 4C:
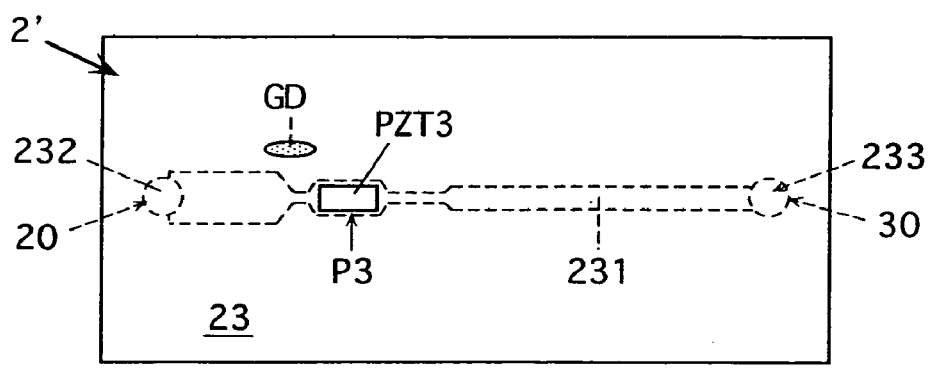
Figure 5A:
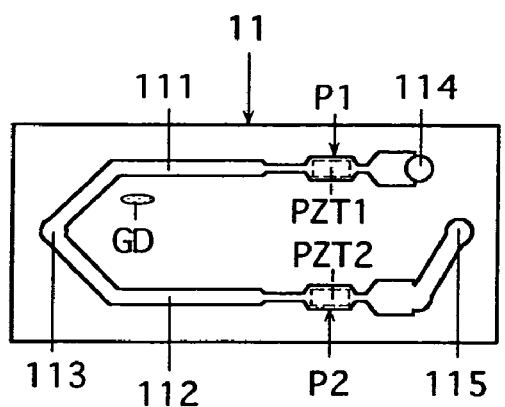
FIGS. 5(A), 5(B), 5(C) and 5(D) are cross sections taken along lines A'-A', C'-C', D'-D' and F'-F' in FIG. 4(B), respectively.
Figure 5C:
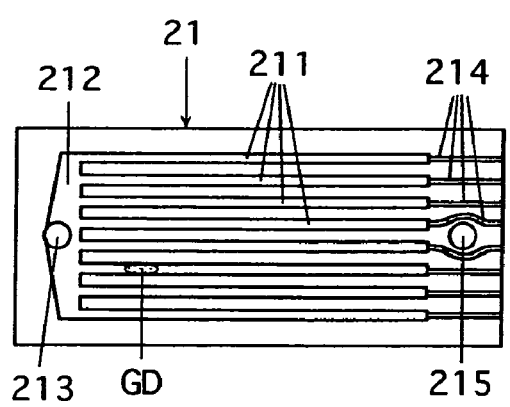
Figure 5B:
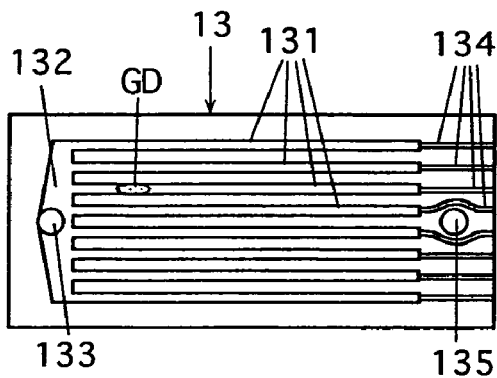
Figure 5D:
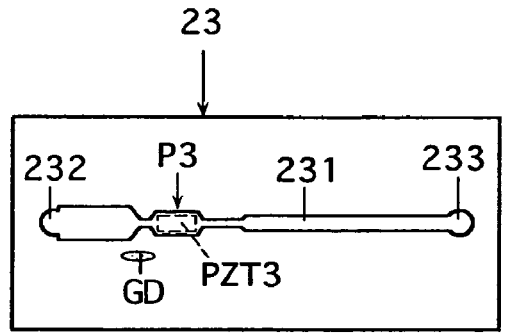

FIGS. 4(A), 4(B) and 4(C) are a plan, a side view and a bottom view of the fuel cell device C1', respectively.

FIGS. 5(A), 5(B), 5(C) and 5(D) are cross sections taken along lines A'-A', C'-C', D'-D' and 'F-F' in FIG. 4(B), respectively.

This fuel cell device C1' is aimed at further reduction in size, weight and cost of the fuel cell device. The pump unit 1' has the same structure as the pump unit 1 of the fuel cell device C1 except for that the middle member 12 is eliminated. The substantially same parts and portions as those in the pump unit 1 bear the same reference numbers.

The pump unit 2' has the same structure as the pump unit 2 of the fuel cell device C1 except for that the middle member 22 is eliminated. The substantially same parts and portions as those in the pump unit 2 bear the same reference numbers.

<Fuel Cell Device C2>

Figure 6:
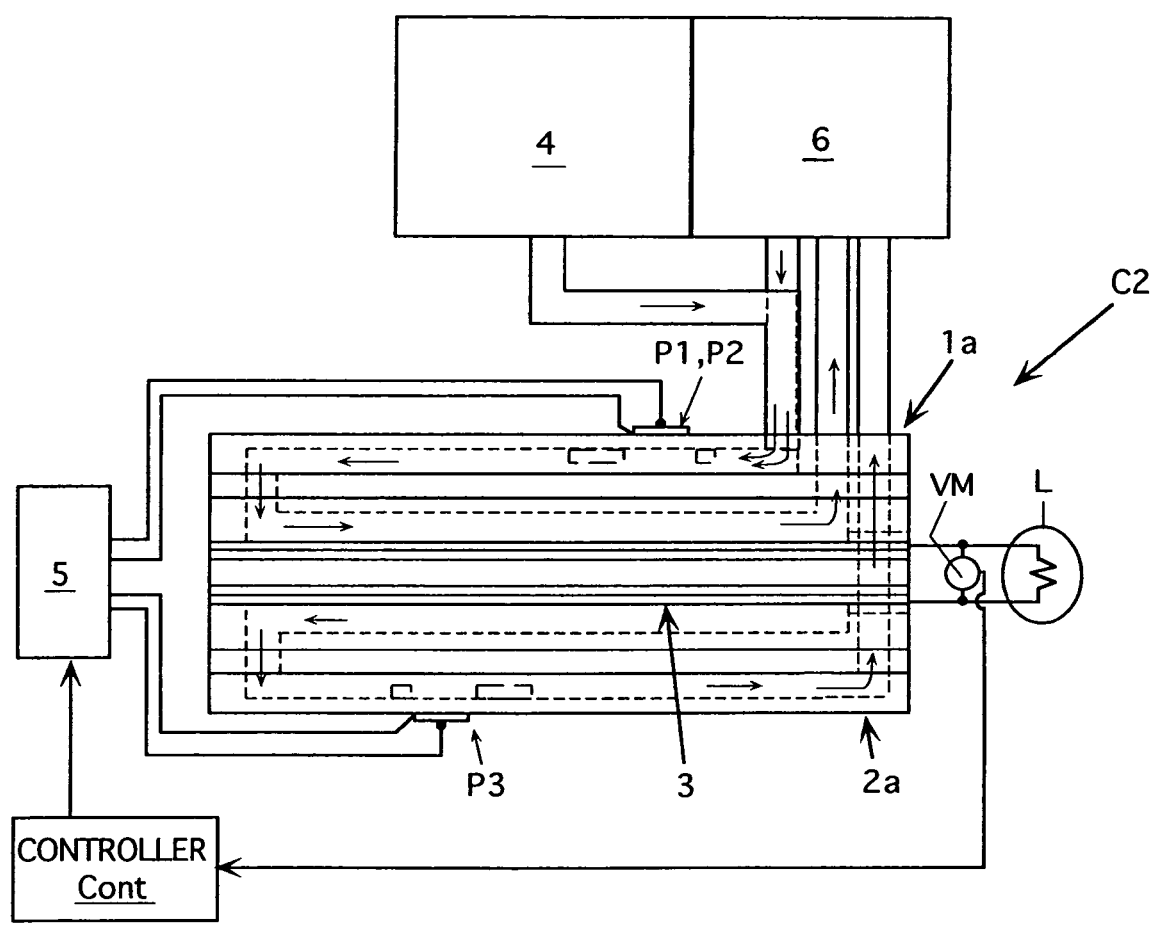
FIG. 6 shows a power generation system utilizing a fuel cell device of a second embodiment of the invention.

FIG. 6 shows a power generation system utilizing a fuel cell device C2.

The fuel cell device C2 includes the fuel cell 3 as well as first and second pump units 1a and 2a, which are stacked and fixed onto the cell 3. Similarly to the fuel cell device C1, the liquid fuel can be supplied from the liquid fuel container 4, and the micropumps P1, P2 and P3 are operated by the pump drive portion 5. In this device C2, the dilution liquid is supplied from a recovery container 6. An excessive portion of the diluted liquid fuel, which was supplied to the cell fuel electrode from the pump unit 1a, returns to the recovery container 6. For achieving an appropriate methanol concentration of the diluted liquid fuel, a voltmeter VM is connected to the fuel cell 3 for detecting the concentration. The voltmeter VM indicates a voltage value, which is fed back to a controller Cont. Based on the fed-back value, the controller Cont sends an instruction to the pump drive portion 5 to achieve the appropriate methanol concentration of the diluted liquid fuel by controlling the pumps P1, P2 and P3. In this manner, the device controls the methanol concentration of the diluted liquid fuel to be supplied to the cell fuel electrode.

The fuel cell device C2 is substantially the same as the fuel cell device C1 except for that pump units 1a and 2a are employed as the first and second pump units, respectively, and the recovery container 6 is employed in addition to the liquid fuel container 4.

Figure 7A:
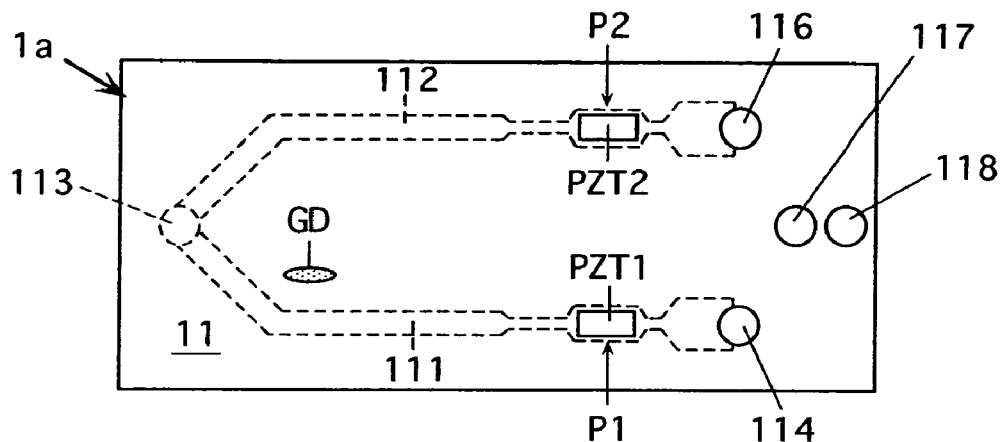
FIGS. 7(A), 7(B) and 7(C) are a plan, a side view and a bottom view of the fuel cell device of the second embodiment of the invention.
Figure 7B:
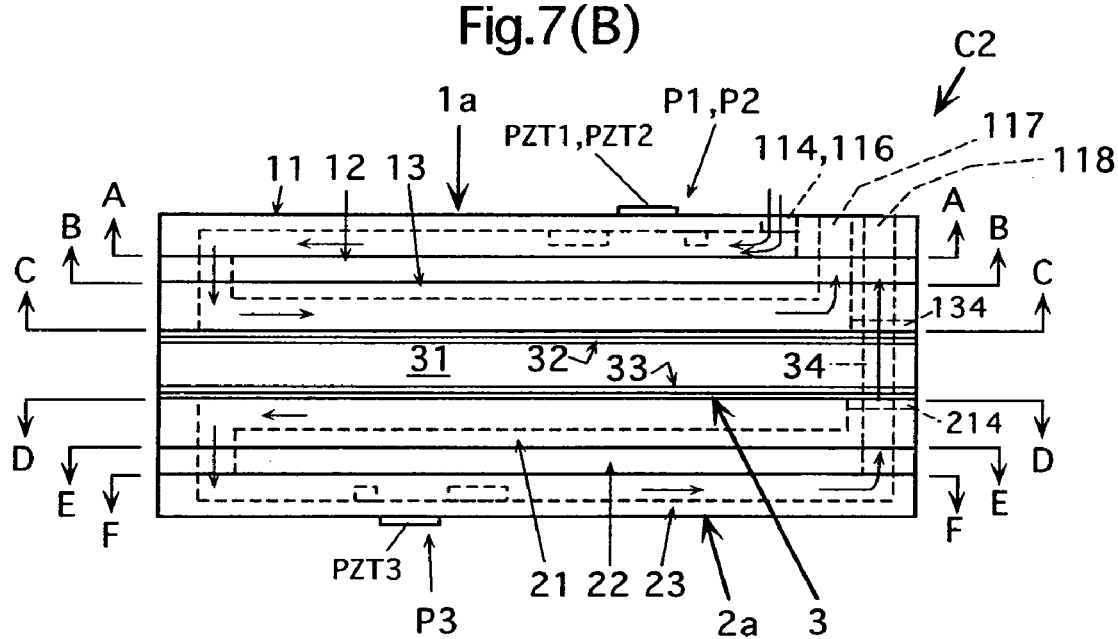
Figure 7C:
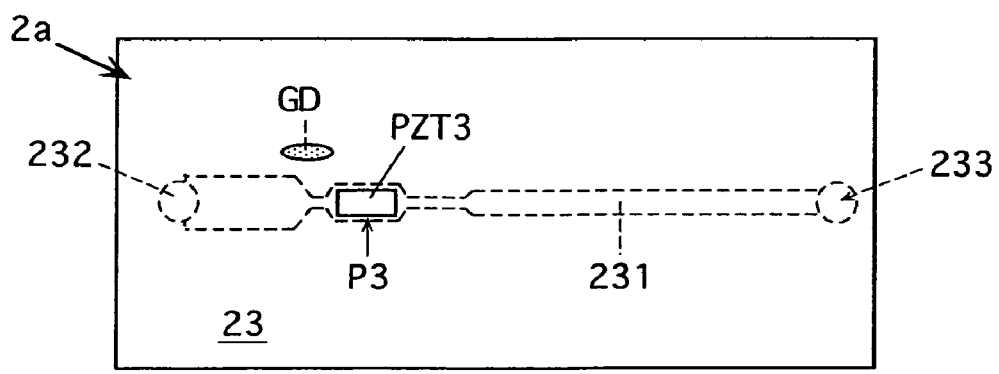

FIGS. 7(A), 7(B) and 7(C) show the fuel cell device C2. More specifically, FIG. 7(A), FIG. 7(B) and FIG. 7(C) are a plan, a side view and a bottom view of the fuel cell device C2, respectively.

FIGS. 8(A), 8(B), 8(C), 8(D), 8(E), and 8(F) are cross sections taken along lines A-A, B-B, C-C, D-D, E-E and F-F, respectively.

In FIG. 6, FIGS. 7(A) to 7(C) and FIGS. 8(A) to 8(F), the substantially same parts and portions as those in the fuel cell device C1 already described bear the same reference numbers.

The first pump unit 1a is the same as the first pump unit 1a in the fuel cell device C1 except for the following points.

Figure 8A:
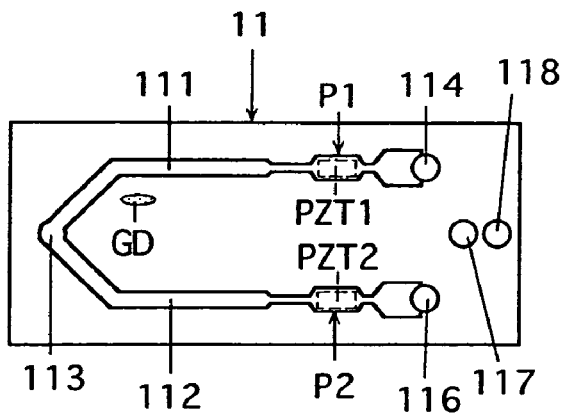
FIGS. 8(A), 8(B), 8(C), 8(D), 8(E) and 8(F) are cross sections taken along lines A-A, B-B, C-C, D-D, E-E and F-F in FIG. 7(B), respectively.
Figure 8D:
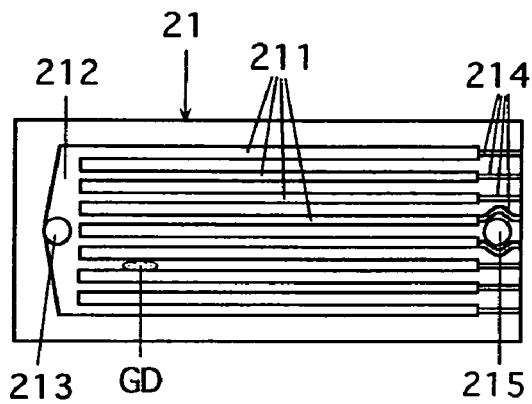
Figure 8B:
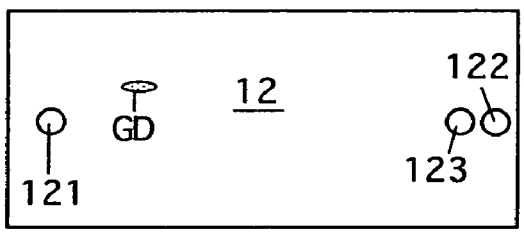
Figure 8E:
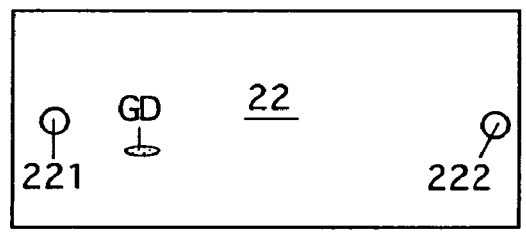

As shown in FIGS. 7(A) and 8(A), the pump unit 1a includes a dilution liquid supply port 116, which is formed at an end of the dilution liquid supply passage 112 in the member 11. The dilution liquid supply port 116 is located upstream to the pump P2, and is connected to the recovery container 6 (see FIG. 6). Further, the member 11 is provided with an excessive fuel outlet 117 and a collected liquid outlet 118, which are connected to the recovery container 6 via piping. The outlets 117 and 118 extend through the member 11, and continue to through holes 123 and 122 in the lower member 12 (see FIG. 8(B)), respectively.

Figure 8C:
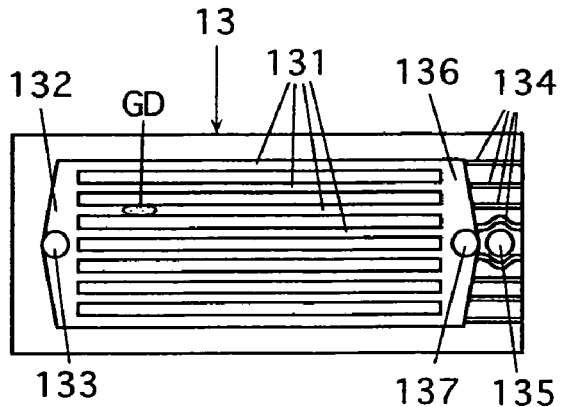
Figure 8F:
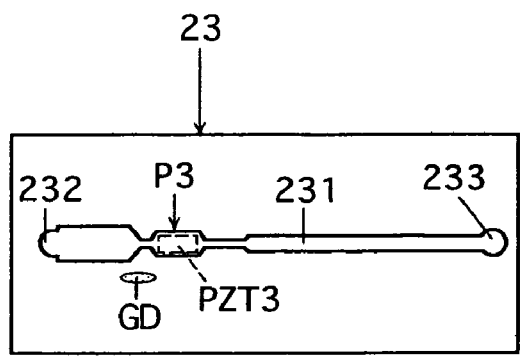

In the pump unit 1a, as shown in FIG. 8(C), the member 13 having passages 131 and 132 for the diluted liquid fuel is also provided at its surface opposed to the cell fuel electrode 32 with a concave passage 136, which is remote from the passage 132 and is connected to the passages 131. The member 13 is further provided with a through hole 137 connected to the passage 136.

In the pump unit 1a, the diluted liquid fuel flows from the mixing passage 113 in the member 11 through the through hole 121 in the middle member 12, the through hole 133 in the member 13 and passages 132, 131 and 136 in the member 13 to the fuel electrode 32. The surplus fuel is sent to the recovery container 6 through the through hole 137 in the member 13, the through hole 123 in the middle member 12 and the outlet 117 in the member 11.

The pump unit 2a is substantially the same as the pump unit 2, as shown in FIG. 7(C) and FIGS. 8(D) to 8(F).

The produced water and the liquid moving from the fuel electrode side which are collected by the second pump unit 2a are sent to the recovery container 6 via the liquid discharging portion 233 in the member 23, the through hole 222 in the middle member 22 and the through hole 215 in the member 21 of the second pump unit 2a, and the liquid passage 34 in the cell 3 (see FIG. 7(B)), and the through hole 135 in the member 13, the through hole 122 in the member 12 and the outlet 118 in the member 11 of the first pump unit 1a.

According to the fuel cell device C2, methanol-contained liquid (e.g., high-concentration aqueous methanol solution) is supplied as the liquid fuel to the first pump unit 1a from the liquid fuel container 4, and the dilution liquid is supplied from the recovery container 6 containing the water or the like. The pump drive portion 5 applies the alternating voltages to the piezoelectric elements PZT1-PZT3 of the pumps P1-P3 so that the pumps are driven to generate the power, and the cell 3 can supply the power to the load L connected thereto.

The cell 3 can be supplied with the diluted liquid fuel for power generation and, even in an initial stage of use of the fuel cell device C2, this diluted liquid fuel can be prepared by diluting the liquid fuel (methanol-contained liquid) supplied from the container 4 by the first pump unit 1a with the dilution liquid supplied from the recovery container 6 by mixing them at an intended rate. The surplus liquid fuel can be sent from the outlet 117 of the first pump unit 1a to the recovery container 6. The water produced on the air electrode side by the electrochemical reaction of the cell 3 and the liquid moving from the fuel electrode side can be circulated from the second pump unit 2a through the liquid outlet 118 in the first pump unit 1a to the recovery container 6.

The fuel cell device C2 described above likewise has a compact and flat form as a whole, and can be configured to have, e.g., a card-like form, which is suitable for a power source of a portable device and others.

<Fuel Cell Device C2'>

For example, in the fuel cell device C2 described above, as shown in FIGS. 9(A) to 9(C) and FIGS. 10(A) to 10(D), the first and second pump units 1a and 2a may be replaced with first and second pump units 1a' and 2a' to provide a fuel cell device C2', respectively.

Figure 9A:
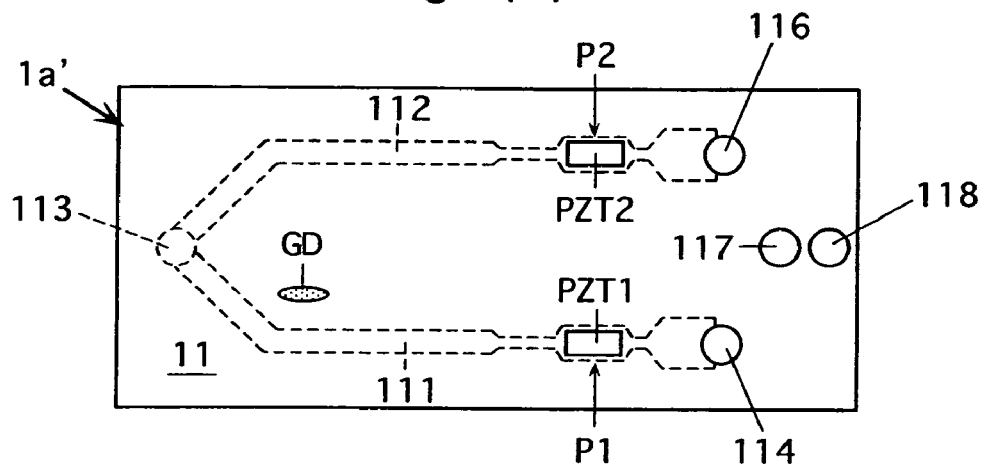
FIGS. 9(A), 9(B) and 9(C) are a plan, a side view and a bottom view of a modification of the fuel cell device shown in FIGS. 7(A), 7(B) and 7(C), respectively.
Figure 9B:
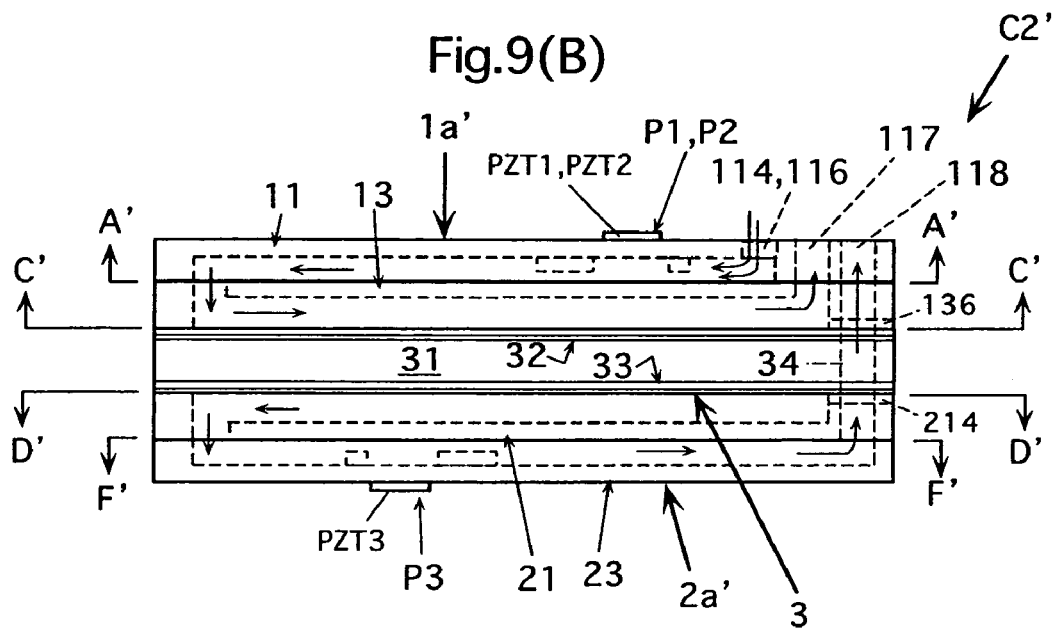
Figure 9C:
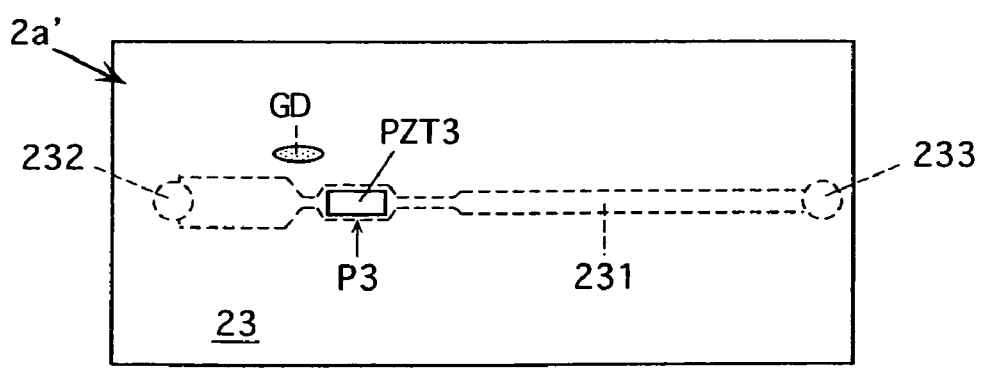
Figure 10:
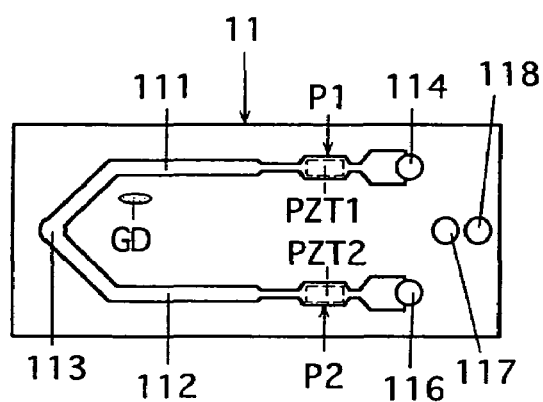
FIGS. 10(A), 10(B), 10(C) and 10(D) are cross sections taken along lines A'-A', C'-C', D'-D'and F'-F' in FIG. 9(B), respectively.
Figure 10:
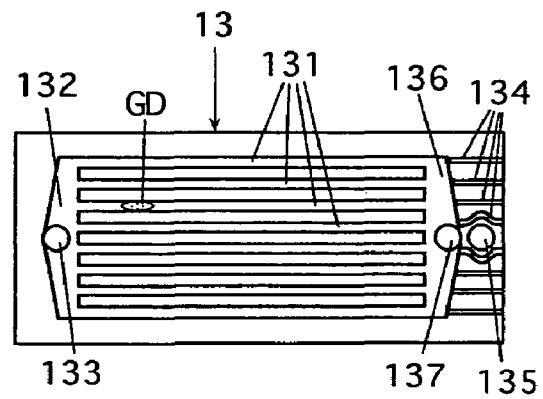
Figure 10:
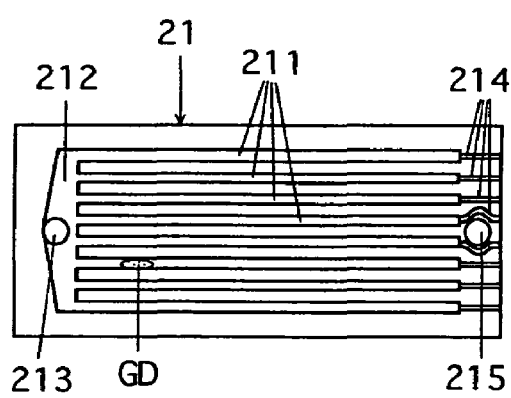
Figure 10:
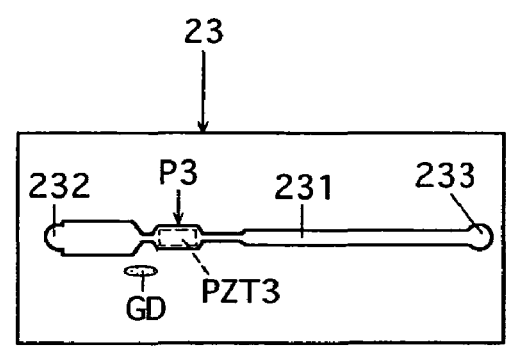

FIGS. 9(A), 9(B) and 9(C) are a plan, a side view and a bottom view of the fuel cell device C2', respectively.

FIGS. 10(A), 10(B), 10(C) and 10(D) are cross sections taken along lines A'-A', C'-C', D'-D' and F'-F' in FIG. 9(B), respectively.

This fuel cell device C2' is aimed at further reduction in size, weight and cost of the fuel cell device. The pump unit 1a' has the same structure as the first pump unit 1a of the fuel cell device C2 except for that the middle member 12 is eliminated. The substantially same parts and portions as those in the pump unit 1a bear the same reference numbers.

The pump unit 2a' has the same structure as the pump unit 2a of the fuel cell device C2 except for that the middle member 22 is eliminated. The substantially same parts and portions as those in the pump unit 2a bear the same reference numbers.

Figure 12A:
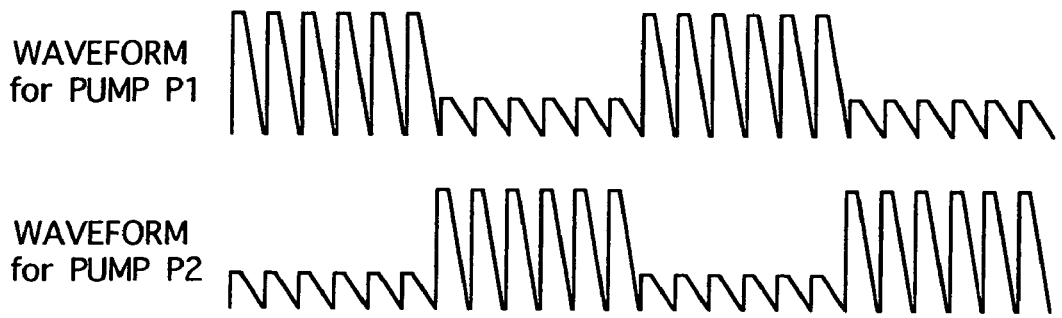
FIG. 12(A) shows another example of a waveform of a micropump drive voltage.
Figure 12B:
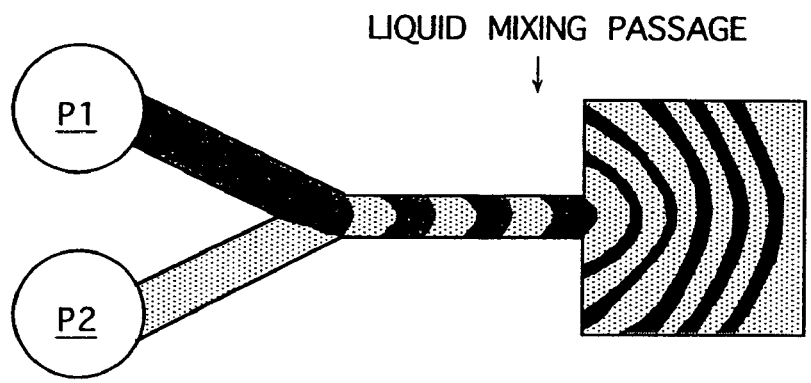
FIG. 12(B) shows a liquid feeding state according to the waveform.
Figure 15:
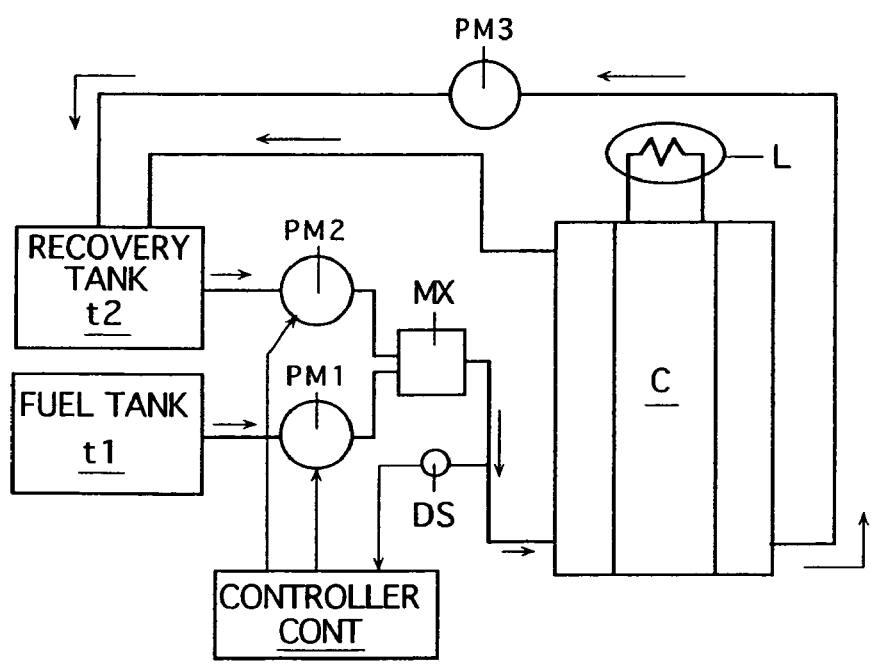
FIG. 15 shows an example of a possible structure of a fuel cell device, in which a fuel cell using liquid fuel is employed, and is supplied with diluted liquid fuel prepared by diluting the liquid fuel with dilution liquid.

In any one of the foregoing fuel cell devices, the micropumps P1 and P2 are driven by the alternating voltage having the waveform shown in FIG. 11(C). For more smoothly and reliably diluting the liquid fuel by mixing the liquid fuel and the dilution liquid together, the alternating voltage applied to the pumps P1 and P2 may have a waveform shown in FIG. 12(A). According to this waveform, as shown in FIG. 12(B), the liquid fuel fed from the pump P1 and the dilution liquid fed from the pump P2 are intermittently supplied to the liquid mixing passage, and thereby are smoothly mixed together so that the intended diluted liquid fuel can be obtained smoothly and reliably.

<Manufacturing of the Micropump Unit>

Some examples of the manufacturing of the micropump units will now be described.

(1) In the Case of Using an Si(Silicon) Substrate and a Glass Plate

Anisotropic etching is effected on a Si substrate to form passage grooves, and a flat glass plate is anodically joined to the Si substrate to form liquid passages. The piezoelectric element for drive is joined to a diaphragm portion of the Si substrate.

According to this method, the liquid passages can be formed by a material having a high Young's modulus so that the pump performance can be improved.

(2) In the Case of Using Resin and a Glass Plate

Injection molding of resin or imprint on resin is performed to form flow grooves, and a thin glass plate is fixed to the resin plate thus prepared by an adhesive to form liquid passages. The piezoelectric element for drive is adhered to a diaphragm portion of the glass plate.

In this manner, the pump unit can be formed inexpensively.

(3) In the Case of Using Glass

The passage grooves are formed on a first glass plate by photolithography effected on a photosensitive glass, sandblasting of glass, glass molding, laser processing effected on a glass plate or the like, and a second flat glass plate is directly joined to the first glass plate. Alternatively, a low-melting glass film is formed on either one or both of the joining surfaces of the first and second glass plates by sputtering, vapor deposition or the like, and these plates are joined together by the application of heat and pressure. Also, a Si film may be formed on one of the first and second glass plates by sputtering or the like, and these plates may be anodically joined together. In one of these manners, the liquid passages or the like are formed, and the piezoelectric element is fixed to the diaphragm portion of one of the joined glass plates by an adhesive or the like.

In this manner, the pump unit can be likewise formed inexpensively.

(4) In the Case of Using Ceramic

The passage grooves are formed on a green sheet by molding, sand blasting, laser processing or the like. The green sheets, one or both of which are provided with passage grooves, are positioned and joined together, and these are subjected to baking under a pressure to form an integral structure. Alternatively, the green sheets produced in a similar manner are baked to form ceramic plates, and a low-melting glass film is formed on one of the ceramic plates by sputtering, vapor deposition or the like. Then, these ceramic plates are joined together by application of heat and pressure. In another manner, a glass film and a Si film are formed on the two ceramic plates formed by the baking in a similar manner, respectively, and are anodically joined together. In one of these manners, the liquid passages are formed, and the piezoelectric element is fixed to the diaphragm portion of one of the joined ceramic plates by an adhesive or the like.

According to the above manners, the liquid passages can be formed by the material having a high Young's modulus so that the pump performance can be improved.

Instead of the above structures and manners, it is possible to employ a member produced by electroforming, a molded carbon member, an etched stainless steel plate or the like, which are provided with a groove allowing flowing of liquid or gas.

In any one of the foregoing manners (1)-(4), a gas vent and an air intake are formed during the above processing, if necessary. The gas flowing portions DG may be formed simultaneously with the foregoing processing, if possible, and may be formed in a later step.

By employing the above methods, it is possible to miniaturize the micropumps. For example, it is possible to produce the pumps each having a thickness of 0.3 mm-1.0 mm, a width of 5 mm and a length of 20 mm.

Figure 13A:
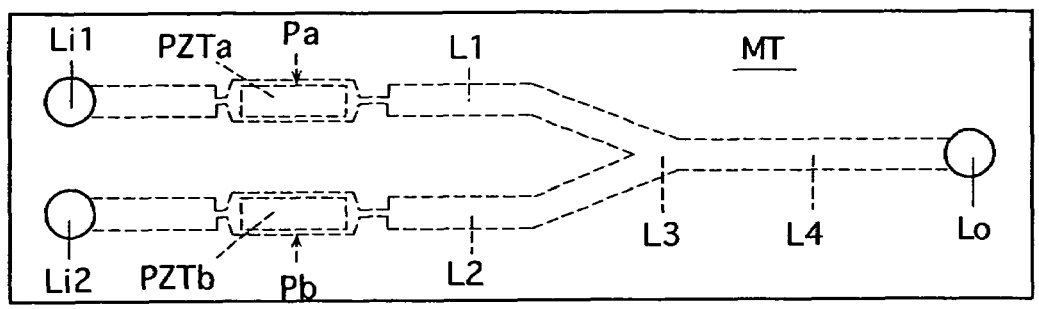
FIGS. 13(A), 13(B) and 13(C) show, for a reference purpose, a microchip for illustrating an example of a method of producing a micropump unit, and are a plan, a side view and a cross section, which is taken along line X-X in FIG. 13(B), of the microchip, respectively.
Figure 13B:
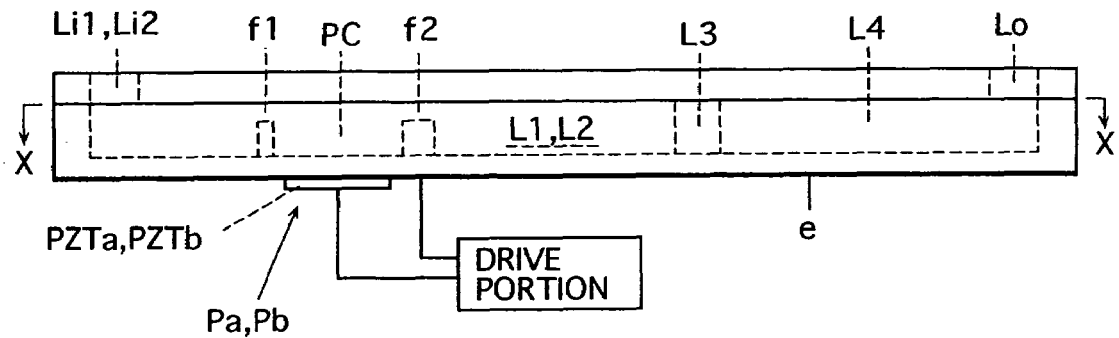
Figure 13C:
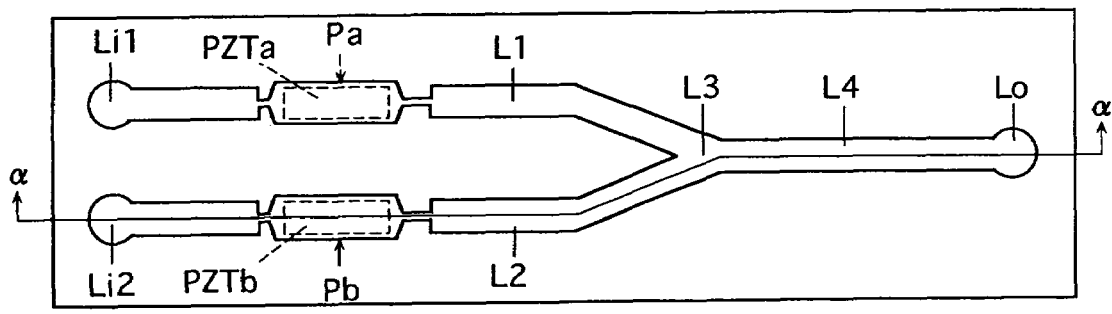

Description will now be given on a specific example of manufacturing a liquid feeding portion including the micropump of the micropump unit. For the sake of simple illustration and easy understanding, the following description will be given on an example of a microchip MT, which is shown in FIGS. 13(A), 13(B) and 13(C), and functions similarly to the liquid feeding portion including the micropump. FIG. 13(A) is a plan of the microchip MT, FIG. 13(B) is a side view thereof, and FIG. 13(C) is a cross section taken along line X-X in FIG. 13(B).

The liquid feeding portion including the micropump(s) of the micropump unit in the fuel cell device according to the invention can have a compact flat structure of a small size, similarly to the chip MT.

The liquid feeding device MT in FIGS. 13(A) to 13(C) is of a microchip type, and includes a first liquid supply passage L1 including a micropump Pa, and a second liquid supply passage L2 including a micropump Pb. A liquid supply port Li1 is formed at an upstream end of the supply passage L1, and a liquid supply port Li2 is formed at an upstream end of the supply passage L2. Downstream ends of the supply passages L1 and L2 are joined together to form a Y-shaped joined portion L3, and continue to a mixing passage L4, which extends to a liquid outlet Lo at the passage end.

For example, each of the passages L1-L4 has a width of 150 micrometers and a depth of 170 micrometers. The microchip MT has outer sizes, e.g., of about 20 mm×40 mm×0.5 mm. Naturally, other sizes and forms may be employed.

The structures and operations of the pumps Pa and Pb are the same as those shown in FIGS. 11(A) to 11(C). In this chip, the drive portion applies the alternating voltages to the piezoelectric elements PZTa and PZTb of the respective pumps so that the first liquid and the second liquid can be drawn from the supply ports Li1 and Li2, and are fed to the joined portion L3. The first liquid and the second liquid, which are merged with each other at the joined portion L3, are mixed together in the mixing passage L4, and are discharged from the liquid outlet Lo.

Steps of manufacturing the microchip MT will now be described with reference to FIGS. 14(A) to 14(H). FIGS. 14(A) to 14(H) show a typical example of a cross section taken along line α-α in FIG. 13(C).

Figure 14A:
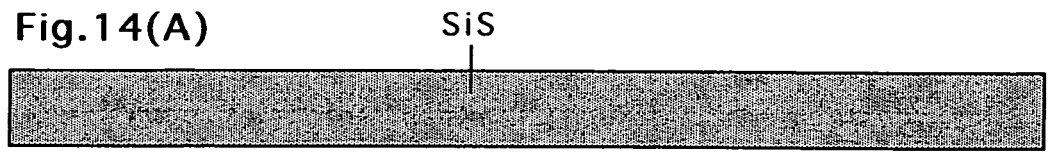
FIGS. 14(A) to 14(H) show, by way of example, manufacturing steps of the microchip.
Figure 14B:
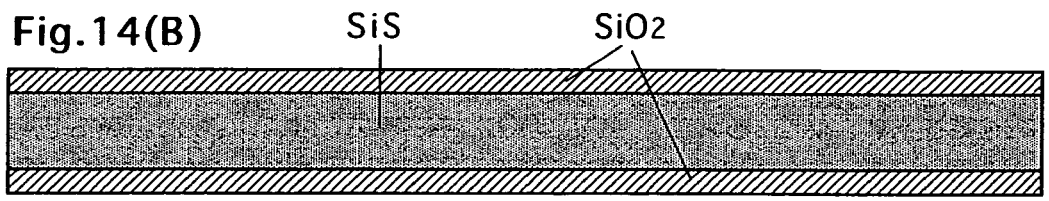
Figure 14C:
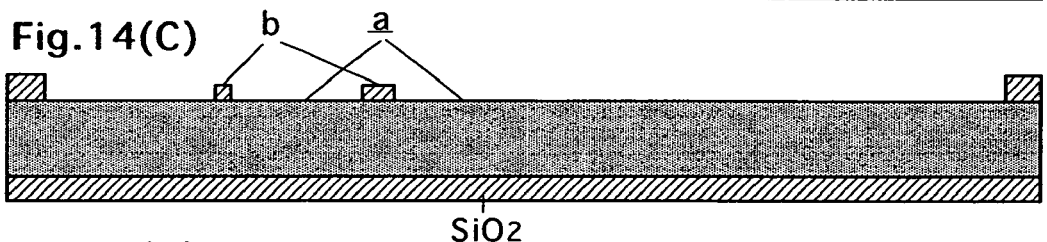

A silicon substrate SiS is prepared as shown in FIG. 14(A). For example, the silicon substrate SiS is formed of a silicon wafer of 200 micrometers in thickness. Then, as shown in FIG. 14(B), silicon oxide films $SiO_2$ are formed on the upper and lower surfaces of the silicon substrate SiS, respectively. Each oxide film is prepared, e.g., by thermal oxidation, and has a thickness of 1.7 micrometers. Resist is applied over the upper surface to form a mask of a predetermined pattern, and exposure is effected on the structure thus masked. Then, development is performed, and etching is effected on the oxide film. After removing the resist from the upper surface, resist is applied again, and exposure, development and etching are effected. Thereby, the structure has portions a, from which the oxide film is completely removed, and portions b, in which the oxide film having a reduced thickness is left, as shown in FIG. 14(C).

For the application of the resist, a resist, e.g., of OFPR800 manufactured by Tokyo Ohka Kogyo Co., Ltd. is used, and rotary application is performed by a spin coater to form a resist film, e.g., of 1 micrometer in thickness. Exposure is performed with an aligner, and development is performed with developer. For example, the etching of the oxide film is performed in a Reactive Ion Etching (RIE) method. The resist is removed with a remover liquid such as liquid containing sulfuric acid and hydrogen peroxide.

Figure 14D:
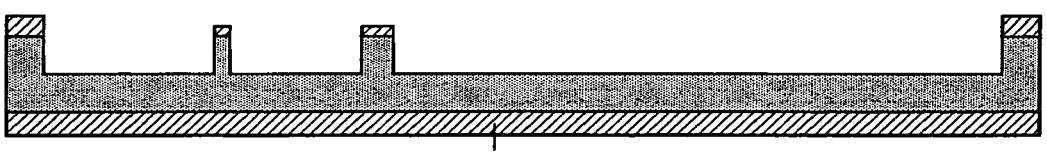
Figure 14E:

Then, as shown in FIG. 14(D), silicon etching is effect on the upper surface to a certain extent, and then etching is effected to remove completely the oxide films on the portions b. Then, silicon etching is performed again to provide the silicon substrate SiS having a portion a' etched by 170 micrometers and a portion a" etched by 25 micrometers, as shown in FIG. 14(E). This silicon etching is performed, e.g., with ICP (Inductively Coupled Plasma). Further, the oxide film is completely removed, e.g., with BHF, as shown in FIG. 14(E).

Figure 14F:
Figure 14G:
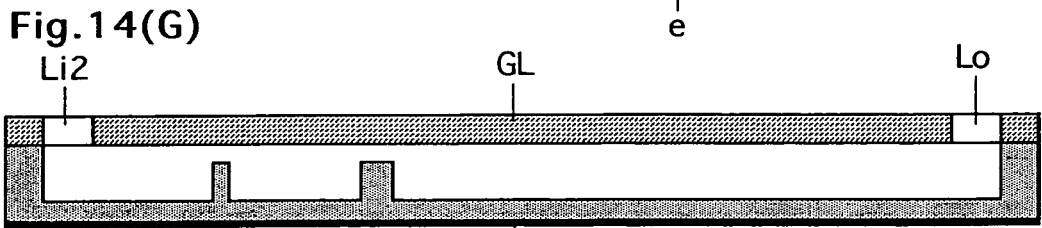
Figure 14H:
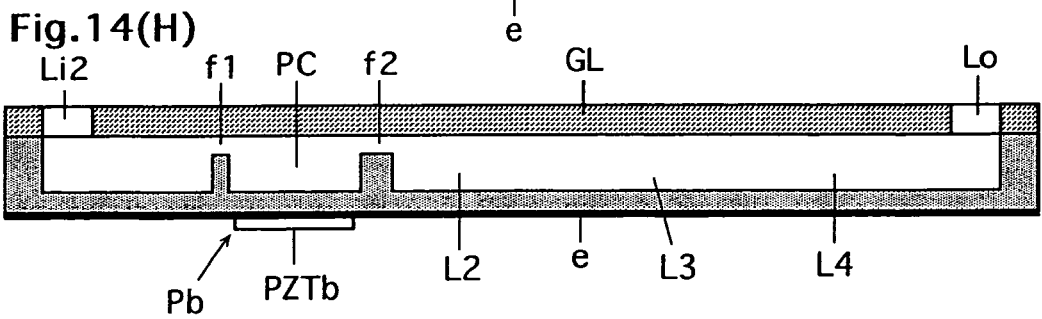

Then, as shown in FIG. 14(F), an electrode film e (e.g., ITO film) is deposited on the lower surface of the silicon substrate. As shown in FIG. 14(G), a glass plate GL is fixed to the upper surface of the silicon substrate, e.g., by anodic joining with 1200 V and 400° C. Finally, as shown in FIG. 14(H), the piezoelectric element is adhered to the portion of the diaphragm of the pump chamber PC.

According to methods corresponding to the method described above, the micropump unit in the liquid fuel cell device of the invention can be manufactured to have uniform performances without variations due to etching processing or the like of plate members.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A fuel cell device employing a fuel cell using liquid fuel, diluting said liquid fuel with dilution liquid and supplying said diluted liquid fuel to said fuel cell, wherein said fuel cell device comprises:
    said fuel cell;
    a first pump unit stacked on a fuel electrode side of said fuel cell, said first pump unit comprising:
        a first flat member comprising a liquid fuel supply passage and a dilution liquid supply passage that are in fluid communication with a mixing passage;
        a second flat member that has a first side in fluid communication with said fuel electrode side of said fuel cell and a second side opposite to said first side that is in fluid communication with said mixing passage, wherein said first pump unit supplies said diluted liquid fuel to a fuel electrode of said fuel cell while diluting said liquid fuel by mixing said liquid fuel and said dilution liquid together;

a first pump formed by said first flat member and said second flat member, wherein said first pump supplies said liquid fuel to said mixing passage;

a second pump formed by said first flat member and said second flat member, wherein said second pump supplies said dilution liquid to said mixing passage, wherein said first pump unit supplies said diluted liquid fuel to a fuel electrode of said fuel cell while diluting said liquid fuel by mixing said liquid fuel and said dilution liquid together;

a second pump unit stacked on an air electrode side of said fuel cell, wherein said second pump unit comprises a third pump for collecting liquid produced by an electrochemical reaction in said fuel cell and liquid moving from said fuel electrode side of said fuel cell through an electrolyte layer of said fuel cell toward said air electrode side of said fuel cell.

2. The fuel cell device according to claim 1, wherein said first pump unit is supplied with said liquid fuel from a liquid fuel container.

3. The fuel cell device according to claim 1, wherein said dilution liquid is formed of said liquid produced by said electrochemical reaction in said fuel cell and said liquid moving from said fuel electrode side of said fuel cell through said electrolyte layer of said fuel cell toward said air electrode side of said fuel cell, and said second pump unit collects, as said dilution liquid, said liquid produced by said electrochemical reaction in said fuel cell and said liquid moving from said fuel electrode side through said electrolyte layer toward said air electrode side, and supplies said dilution liquid to said first pump unit via a dilution liquid circulation passage formed in a structure including said fuel cell, said first pump unit and said second pump unit stacked together.

4. The fuel cell device according to claim 1, wherein said dilution liquid is formed of said liquid produced by said electro chemical reaction in said fuel cell and said liquid moving from said fuel electrode side of said fuel cell through said electrolyte layer of said fuel cell toward said air electrode side of said fuel cell, said second pump unit collects, as said dilution liquid, said liquid produced by said electrochemical reaction in said fuel cell and said liquid moving from said fuel electrode side through said electrolyte layer toward said air electrode side, and feeds said dilution liquid to a recovery container, and said first pump unit is supplied with said dilution liquid from said recovery container.

5. The fuel cell device according to claim 4, wherein said first pump unit feeds excessive diluted liquid fuel to said recovery container.

6. The fuel cell device according to claim 1, wherein each of said fuel cell and said first pump unit has a flat form.

7. The fuel cell device according to claim 1, wherein said first pump unit stacked on said fuel cell neighbors on said fuel electrode.

8. The fuel cell device according to claim 7, wherein said first pump unit comprises a surface opposed to said fuel electrode, wherein an electrode layer electrically connected to said fuel electrode is provided on said surface.

9. The fuel cell device according to claim 7, wherein said first pump unit is provided with a diluted liquid fuel passage that is opposed to said fuel electrode and supplies said diluted liquid fuel to said fuel electrode, and said first pump unit is provided at a portion opposite to said diluted liquid fuel passage opposed to said fuel electrode with said liquid fuel supply passage including said first pump for supplying said liquid fuel, said dilution liquid passage including said second pump for supplying said dilution liquid, and said mixing passage communicated with both said liquid fuel supply passage and said dilution liquid supply passage, and communicated with said diluted liquid fuel passage, and has a gas-draining vent for discharging a gas generated around said fuel electrode through said diluted liquid fuel passage.

10. The fuel cell device according to claim 1, wherein each of said fuel cell, said first pump unit and said second pump unit has a flat form.

11. The fuel cell device according to claim 1, wherein said first pump unit stacked on said fuel cell neighbors on said fuel electrode of said fuel cell, and said second pump unit stacked on said fuel cell neighbors on an air electrode of said fuel cell.

12. The fuel cell device according to claim 11, wherein said first pump unit is provided at its surface opposed to said fuel electrode with an electrode layer electrically connected to said fuel electrode, said second pump unit is provided at its surface opposed to said air electrode with an electrode layer electrically connected to said air electrode, or said first pump unit and said second pump unit are provided at their surfaces opposed to said fuel electrode and said air electrode with the electrode layers electrically connected to said fuel electrode and said air electrode, respectively.

13. The fuel cell device according to claim 11, wherein said first pump unit is provided with a diluted liquid fuel passage opposed to said fuel electrode and supplies said diluted liquid fuel to said fuel electrode, is provided at a portion opposite to said diluted liquid fuel passage opposed to said fuel electrode with said liquid fuel supply passage including a micropump for supplying said liquid fuel, said dilution liquid passage including a micropump for supplying said dilution liquid, and a liquid mixing passage communicated with both said liquid fuel supply passage and said dilution liquid supply passage, and communicated with said diluted liquid fuel passage, and has a gas-draining vent for discharging a gas generated around said fuel electrode through said diluted liquid fuel passage; and said second pump unit is provided with a passage opposed to said air electrode for collecting said liquid produced by the electrochemical reaction in said fuel cell and said liquid moving from said fuel electrode side of said fuel cell through an electrolyte layer of said fuel cell toward said air electrode side of said fuel cell, is provided at a portion opposite to said passage opposed to said air electrode with a liquid collecting passage including a micropump for collecting said liquid, has a passage extending from said liquid passage opposed to said air electrode to said liquid collecting passage, and has an air intake for supplying an external air to said air electrode via said liquid passage opposed to said air electrode.

14. The fuel cell device according to claim 9, wherein each of said first and second pumps includes a first restrictor passage for drawing in said liquid, a second restrictor passage for discharging said liquid, a pump chamber located between said first and second restrictor passages, and a piezoelectric element arranged on a flexible wall of said pump chamber, said piezoelectric element vibrates said pump chamber wall to shrink and expand said pump chamber for drawing said liquid from said first restrictor passage into said pump chamber and discharging said liquid from said pump chamber through said second restrictor passage.

15. The fuel cell device according to claim 13, wherein each of said first and second pumps includes a first restrictor passage for drawing in said liquid, a second restrictor passage for discharging said liquid, a pump chamber located between said first and second restrictor passages, and a piezoelectric element arranged on a flexible wall of said pump chamber, said piezoelectric element vibrates said pump chamber wall to shrink and expand said pump chamber for drawing said liquid from said first restrictor passage into said pump chamber and discharging said liquid from said pump chamber through said second restrictor passage.

16. The fuel cell device according to claim 1, wherein said fuel cell is a direct methanol fuel cell, said liquid fuel is methanol-contained liquid fuel, and said dilution liquid is liquid containing water.

17. The fuel cell device according to claim 16, wherein said direct methanol fuel cell has a membrane electrode assembly structure.

18. The fuel cell device according to claim 1, wherein said second flat member is stacked on said first flat member.

19. The fuel cell device according to claim 1, further comprising a third flat member interposed between and in fluid communication with said first flat member and said second flat member.

* * * * *

UNITED STATES PATENT AND TRADEMARK OFFICE
CERTIFICATE OF CORRECTION

PATENT NO. : 7,666,538 B2
APPLICATION NO. : 11/005747
DATED : February 23, 2010
INVENTOR(S) : Ishida et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1202 days.

Signed and Sealed this

Seventh Day of December, 2010

David J. Kappos
*Director of the United States Patent and Trademark Office*